United States Patent [19]
Ooka et al.

[11] Patent Number: 5,557,719
[45] Date of Patent: Sep. 17, 1996

[54] METHOD AND APPARATUS FOR FORMING OBJECTS BASED ON FREE-FORM CURVES AND FREE-FORM SURFACES FROM PROJECTING NODAL POINTS AND A SERIES OF POINTS ONTO A PATCH

[75] Inventors: Miwa Ooka; Tetsuzo Kuragano, both of Tokyo, Japan

[73] Assignee: Sony Corp., Tokyo, Japan

[21] Appl. No.: 389,562

[22] Filed: Feb. 15, 1995

Related U.S. Application Data

[63] Continuation of Ser. No. 966,509, Oct. 23, 1992, abandoned.

[30] Foreign Application Priority Data

Oct. 30, 1991 [JP] Japan .................................. 3-313634

[51] Int. Cl.[6] .................................................. G06T 17/30
[52] U.S. Cl. .......................................... 395/141; 395/119
[58] Field of Search ................................... 395/119, 137, 395/141, 142, 134, 127

[56] References Cited

U.S. PATENT DOCUMENTS

| | | | |
|---|---|---|---|
| 4,646,251 | 2/1987 | Hayes et al. | 364/518 |
| 4,763,280 | 8/1988 | Robinson et al. | 395/141 X |
| 4,829,456 | 5/1989 | Joonishi et al. | 395/119 |
| 4,890,242 | 12/1989 | Sinha et al. | 395/119 |
| 4,905,166 | 2/1990 | Schuerman | 395/142 X |
| 4,949,281 | 8/1990 | Hillenbrand et al. | 395/142 |
| 5,033,005 | 7/1991 | Haske | 364/474.29 |
| 5,103,217 | 4/1992 | Cawley | 395/119 X |
| 5,121,333 | 6/1992 | Riley et al. | 395/137 X |
| 5,121,334 | 6/1992 | Riley et al. | 395/119 X |
| 5,129,054 | 7/1992 | Alstad et al. | 395/119 X |
| 5,191,642 | 3/1993 | Quick et al. | 395/137 X |
| 5,214,754 | 5/1993 | Okamoto et al. | 395/142 |
| 5,241,654 | 8/1993 | Kai et al. | 395/142 |
| 5,278,948 | 1/1994 | Luken, Jr. et al. | 395/127 X |
| 5,325,472 | 6/1994 | Horiuchi et al. | 395/119 X |
| 5,344,298 | 9/1994 | Hull | 395/119 X |
| 5,345,546 | 9/1994 | Harada et al. | 395/142 |
| 5,353,389 | 10/1994 | Fiasconaro | 395/119 |
| 5,392,385 | 2/1995 | Evangelisti et al. | 395/141 X |

OTHER PUBLICATIONS

Foley et al, Computer Graphics Principles and Practice, 1990, pp. 70–71, 110–127, 686–695, 924–945, 217 to 253, 471 to 529.

*Primary Examiner*—Almis R. Jankus
*Assistant Examiner*—Anton W. Fetting
*Attorney, Agent, or Firm*—William S. Frommer; Alvin Sinderbrand

[57] ABSTRACT

In a method for forming free-form curves and free-form surfaces, the nodal points of the object to be projected and a series of points set on the object to be projected are projected onto a patch. Free-form curves are generated on the patch on the basis of the result of projection. Thereby, free-form curves of the geometry projecting free-form curves may be generated readily and with high accuracy on the patch and, further, the free-form curves may be used to generate a framing space, or a free-form surface.

5 Claims, 14 Drawing Sheets

METHOD AND APPARATUS FOR FORMING OBJECTS BASED ON FREE-FORM CURVES AND FREE-FORM SURFACES FROM PROJECTING NODAL POINTS AND A SERIES OF POINTS ONTO A PATCH

This application is a continuation of application Ser. No. 07/966,509, filed Oct. 23, 1992, now abandoned.

BACKGROUND OF THE INVENTION

This invention relates to a method of forming free-form curves and free-form surfaces, and more particularly is applicable to an improvement of a designing device using the technique of CAD/CAM (computer aided design/computer aided manufacturing) for example.

In the case where the technique of CAD is used to design the shape of an object having free-form surface (geometric modeling), the designer usually designates a plurality of points (referred to as nodal points) in a three-dimensional space which are passed through by the curved surface. A surface represented by a so-called wire-frame is formed by causing a desired vector function to calculate a boundary curve network which connects the designated nodal points. Thereby, a number of framing spaces surrounded by the boundary curves may be formed (such processing is referred to as framing process).

The boundary curve network formed by such framing process by itself represents a generalized shape of design intended by the designer. A free-form surface (referring to one which cannot be defined by a quadratic function) designed as a whole by the designer may be generated, if it is possible by interpolation to obtain a curved surface which may be represented by a predetermined vector function using the boundary curve surrounding the respective framing spaces. Here, the curved surface pasted on each framing space forms a fundamental element for constructing the total curved surface, and it is referred to as a patch.

In order to give a more natural appearance of the shape to the generated free-form surface as a whole, a method of forming free-form curve (Japanese Patent Application No. 60-277448) has been proposed, in which, for two framing spaces adjoining each other with an interposing common boundary, the control side vectors around the common boundary is redetermined so as to paste a patch which satisfies the condition of continuity of tangential planes at the common boundary.

FIG. 1, illustrates the principle of such free-form surface forming method. Patch vector S(u,v)1 and patch vector S(u,v)2, which are to be pasted onto quadrilateral framing spaces, are represented by a vector function S(u,v) consisting of a third order Bezier expression In order to smoothly connect the two patch vectors S(u,v)1 and vector S(u,v)2, control side vectors, vectors a1, a2, c1, and c2 are determined so that the condition of continuity of tangential planes is satisfied at the common boundary COM of the adjoining patch vectors S(u,v)1 and S(u,v)2 on the basis of the nodal points, vector P(00), vector P(30)1, vector P(33)1, vector P(03), vector P(33)2 and vector P(30)2, which are given by the framing process; and the control point vectors, vector P(11)1, vector P(12)1, vector P(11)2 and vector P(12)2, are redetermined by these control side vectors.

As a result of further applying such technique to other common boundaries, the patch vectors, vector S(u,v)1 and vector S(u,v)2, may be smoothly connected to adjoining patches in accordance with the condition of continuity of tangential planes.

Here, the vector function vector S(u,v) formed of a third order Bezier expression is represented using parameters u and v in the u direction and the v direction and shift operators E and F by the following formula:

$$S(u,v)=(1-u+uE)^3(1-v+vF)^3P(00) \tag{1}$$

and is related to the control point vectors P(ij) as follows:

$$E \cdot P(ij)=P(i+1,j)(i,j=0, 1, 2) \tag{2}$$

$$F \cdot P(ij)=P(i,j+1)(i,j=0, 1, 2) \tag{3}$$

$$0 \leq u \leq 1 \tag{4}$$

$$0 \leq v \leq 1 \tag{5}$$

Further, a tangential plane refers to the plane formed by the tangential vectors in the u direction and the v direction at each point on the common boundary. For example, the condition of continuity of tangential planes is satisfied with respect to the common boundary COM12 of FIG. 1 when the tangential planes of the patch vectors, vector S(u,v)1 and vector S(u,v)2, are identical to each other.

According to this method, it is possible to design the shape of an object that has a smooth changing surface geometry.

In such a designing device, it is presumably convenient if a desired curve may be projected with respect to a generated patch, because it is for example possible to extract the projected curve to observe the cross-sectional geometry thereof or to observe the state after grooving or boring.

It is also possible to observe a parting line at the time of injection molding or to observe the state where a seal is pasted onto a curved surface.

Further, a new patch may be generated by using the generated curve.

SUMMARY OF THE INVENTION

In view of the foregoing, an object of this invention is to provide a free-form curve forming method and a free-form surface forming method in which a free-form curve and a free-form surface may be generated by projecting such as a curve onto a desired plane.

To achieve such objects, in a first aspect of the present invention, in a curve forming method where control points (vector P1 and vector P2) are formed between two nodal points (vector P0 and vector P3) on a three-dimensional space to generate a free-form curve C(t) represented by a vector function (vector C(t)) using a predetermined parameter t on the basis of the nodal points (vector P0, vector P3) and the control points (vector P1, vector P2): with respect to patch (vector S(u,v)1 to S(u,v)4) represented by a predetermined vector function (vector S(u,v)) formed on a framing space, the patch (vector S(u,v)1 to S(u,v)4) is rotated so as to make either the x-direction, y-direction or z-direction as the projecting direction DIR; the maximum value and the minimum value are then found of y and z coordinate values, x and z coordinate values or x and y coordinate values with respect to control points (vectors P00 to P33) of the rotated patch (vector S(u,v)1 to S(u,v)4); on the basis of the found result, it is judged with respect to the free-form curve (vector C(t)) to be projected whether it is possible to project the nodal points (vector PC0 and vector PC3) onto the original patch (vector S(u,v)1 to S(u,v)4) from the projecting direction DIR; on the basis of the judged result, projection nodal points (vector C0 and vector C3) are generated with respect to the free-form curve (vector C(t)) to be projected, which are formed by projecting the nodal points (vector PC0 and vector PC3) onto the original patch (vector S(u,v)1 to S(u,v)4) from the projecting direction DIR; a series of points (vector q0 to vector q11) are generated on the free-form curve (vector C(t)) to be projected; on the basis of the found result, it is judged whether projection is possible with respect to the series of points (vector q0 to vector q11) onto the original patch (vector S(u,v)1 to S(u,v)4) from the projecting direction DIR; on the basis of the judged result, projection point series (vector qa0 to vector qa11) are formed, which are formed by projecting the respective points of the series of points (vector q0 to vector q11) from the projecting direction DIR onto the original patch (vector S(u,v)1 to S(u,v)4); and, on the basis of the projection nodal points (vector C0 and vector C3) and said projected series of points (vector qa0 to vector qa11) a free-form curve (vector C) is generated, which has a geometry obtained by projecting the free-form curve (vector C(t)) to be projected onto the original patch (vectors S(u,v)1 to S(u,v)4) from the projecting direction DIR.

Further, in accordance with a second aspect of the present invention: the original patch (vectors S(u,v)1 to S(u,v)4) are consisting of a plurality of patches; the respective patch (vectors S(u,v)1 to S(u,v)4) are rotated so as to make either the x-direction, y-direction or z-direction as the projecting direction DIR; the maximum value and the minimum value are then found of y and z coordinate values, x and z coordinate values or x and y coordinate values with respect to control points (vectors P00 to P33) of the rotated patch (vectors S(u,v)1 to S(u,v)4); on the basis of the found result, it is judged with respect to the free-form curve (vector C(t)) to be projected whether it is possible to project the nodal points (vector PC0 and vector PC3) onto the respective original patch (vectors S(u,v)1 to S(u,v)4) from the projecting direction DIR; on the basis of the judged result, projection nodal points (vector C0 and vector C3) and generated with respect to the free-form curve (vector C(t)) to be projected, which are formed by projecting the nodal points (vector PC0 and vector PC3) onto the original patch (vectors S(u,v)1 to S(u,v)4) from the projecting direction DIR; on the basis of the found result, it is judged whether projection is possible with respect to a series of points (vector q0 to vector q11) onto the original patch (vector S(u,v)1 to S(u,v)4) from the projecting direction DIR; on the basis of the judged result, projection point series (vector qa0 to vector qa11) are formed, which are formed by projecting the respective points of the series of points (vector q0 to vector q11) from the projecting direction DIR onto the original patch (vector S(u,v)1 to S(u )4); and, on the basis of the projected nodal points (vector C0 and vector C3) and the projected series of points (vector qa0 to vector qa11) a free-form curve vector C) is generated, which has a geometry obtained by projecting the free-form curve (vector C(t)) to be projected onto the original plurality of patch (vectors S(u,v)1 to S(u,v)4) from the projecting direction DIR.

Furthermore, in accordance with a third aspect of the present invention: free-form curves (COM1 to COM4) that are to be projected consist of boundary curves (COM1 to COM4) which form a predetermined framing space; free-form curves (COM1N to COM4N) are projected onto an original patch (vector S(u,v)) which has a geometry obtained by projecting the free-form curves (COM1 to COM4) to be projected onto the original patch (vector S(u,v)) from the projecting direction DIR; and a framing space is generated, which has boundary curves consisting of the free-form curves generated on the original patch (vector S(u,v)).

Moreover, in accordance with a fourth aspect of the present invention: free-form curves (COM1N to COM4N) having a geometry obtained by projecting boundary curves (COM1 to COM4) forming a predetermined framing space from a predetermined direction DIR onto an original patch (vector S(u,v)) are generated on the original patch vector S(u,v) to form a framing space having as its boundary curves the free-form curves (COM1N to COM4N) generated on the original patch (vector S(u,v)); a patch (vector B) is temporarily generated on the framing space; the temporarily generated patch (vector B) is transformed to generate a patch (vector B) having a surface geometry of the original patch (vector S(u,v)); the free-form curves (COM1N to COM4N) generated on the original patch (vector S(u,v)) are formed such that: the patch (vector S(u,v)) is rotated with respect to the original patch vector so as to make either the x-direction, y-direction or z-direction as the projecting direction DIR; the maximum value and minimum value are then obtained of y and z coordinate values, x and z coordinate values or x and y coordinate values with respect to control points (vector P00 to P33) of the rotated patch (vector S(u,v)); on the basis of the found result, it is judged with respect to the free-form curves (COM1 to COM4) to be projected whether nodal points (vector PC0 and PC3) may be projected onto the original patch (vector S(u,v)) from the projecting direction DIR; on the basis of the judged result, with respect to the free-form curves (COM1 to COM4) projection nodal points (vector C0 and vector C3) are generated, which are formed by projecting the nodal points (vector P0 and vector P3) from the projecting direction DIR onto the original patch (vector S(u,v)); a series of points, vector q0 to vector q11, are generated on the free-form curve COM1 to COM4 to be projected; on the basis of the found result, it is judged whether projection is possible from the projecting direction DIR onto the original patch vector S(u,v) with respect to each point of the series of points (vector q0 to vector q11); on the basis of the judged result, projection series of points (vector qa0 to vector qa11) are formed, which are formed by projecting the respective points of the series of points (vector q0 to vector q11) onto the original patch (vector S(u,v)) from the projecting direction DIR; and the free-form curves (COM1N to COM4N) are formed, which have a geometry obtained by projecting the free-form curves (COM1 to COM4) to be projected, generated on the basis of the projection nodal points (vector C0 and vector C3) and the projection series of points (vector qa0 to vector qa11) onto the original patch (vector S(u,v)) from the projecting direction DIR.

Further, in accordance with a fifth aspect of the present invention: a line segment (vector L) connecting an apex (vector Q00) of a trigonal patch (vector S(u,v)) and a boundary curve (vector C3) is formed; a reference point (vector H) is set on the line segment (vector L); the reference point (vector H) is then projected onto the trigonal patch (vector S(u,v)) to set a partition point (vector HN) on the trigonal patch (vector S(u,v)); line segments (vector D1, vector D2 and vector D3) are formed connecting the partition point (vector HN) and the respective boundary curves (vector C1, vector C2 and vector C3) of the trigonal patch (vector S(u,v)); the line segments (vector D1, vector D2 and vector D3) are projected onto the trigonal patch (vector S(u,v)) to generate Bezier curves (vector D1N, vector D2N and vector D3N) on the trigonal patch (vector S(u,v)); a framing space is formed by Bezier curves (vector D1N, vector D2N and vector D3N) and boundary curves (vector C1A, vector C1B, vector C2A, vector C2B, vector C3A and vector C3B) which are divided by Bezier curves (vector D1N, vector D2N and vector D3N); internal control points are set in the framing space to generate quadrilateral patches (vector B1, vector B2 and vector B3) having as their boundary curves Bezier curves (vector D1N, vector D2N and vector D3N) and boundary curves (vector C1A, vector C1B, vector C2A, vector C2B, vector C3A and vector C3B) which are divided by Bezier curves (vector D1N, vector D2N and vector D3N); and the surface geometry of the quadrilateral patches (vector B1, vector B2 and vector B3) are transformed into the surface geometry of the original trigonal patch (vector B) so as to convert a trigonal patch (vector B) into a plurality of quadrilateral patches (vector B1, vector B2 and vector B3).

With respect to control points (vector P00 to P33) of a rotated patch (vector S(u,v)1 to S(u,v)4) the maximum values and the minimum values are found of y and z coordinate values, x and z coordinate values and x and y coordinate values; on the basis of the found result, it is judged whether nodal points (vector PC0 and vector PC3) a series of points (vector q0 to vector q11) may be projected onto the original patch (vector S(u,v)1 to S(u,v)4); on the basis of the judged result, the nodal points (vector PC0 and vector PC3) the series of points (vector q0 to vector q11) are projected onto the original patch (vector S(u,v)1 to S(u,v)4). On the basis of the projection nodal points (vector C0 and vector C3) the projection series of points (vector qa0 to vector qa11) a free-form curve (vector C) of the geometry obtained by projecting the free-form curve (vector C(t)) onto the original patch (vectors S(u,v)1 to S(u,v)4) may readily be generated.

If, at this time, the original patch (vector S(u,v)1 to S(u,v)4) is consisting of a plurality of patches, the respective patch (vectors S(u,v)1 to S(u,v)4) are rotated; the maximum values and the minimum values of y and z coordinate values, x and z coordinate values or x and y coordinate values are then found with respect to control points (vector P00 to P33) of each of the rotated patch (vectors S(u,v)1 to S(u,v)4); and a judgment is made on the basis of the found result as to whether projection is possible. A free-form curve (vector C) of the geometry obtained by projecting free-form curve (vector C(t)) onto a plurality of patch (vectors S(u,v)1 to S(u,v)4) may be generated.

On the other hand, boundary curves (COM1 to COM4) forming a predetermined framing space are projected onto a patch (vector S(u,v)) a framing space may be generated by free-form curves (COM1N to COM4N) of the geometry obtained by projecting the free-form curves (COM1 to COM4) onto the patch (vector S(u,v)).

Thereby, a patch (vector B) is generated in the framing space and it is transformed into the surface geometry of the original patch (vector S(u,v)) to readily generate a patch (vector B) of a desired size having the original surface geometry.

By projecting line segments (vector D1, vector D2 and vector D3), Bezier curves (vector D1N, vector D2N and vector D3N) are generated on a trigonal patch (vector S(u,v)); the Bezier curves (vector D1N, vector D2N and vector D3N) are utilized to generate quadrilateral patches (vector B1, vector B2 and vector B3); and the surface geometry of the quadrilateral patches (vector B1, vector B2 and vector B3) is transformed into the surface geometry of the original trigonal patch (vector B). Thereby, the trigonal patch (vector B) may be converted readily and with high accuracy into a plurality of quadrilateral patches, (vector B1, vector B2 and vector B3).

The foregoing objects and other objects of the invention have been achieved by the provision of a method for forming free-form curves, and a method for free-form surfaces.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 2:
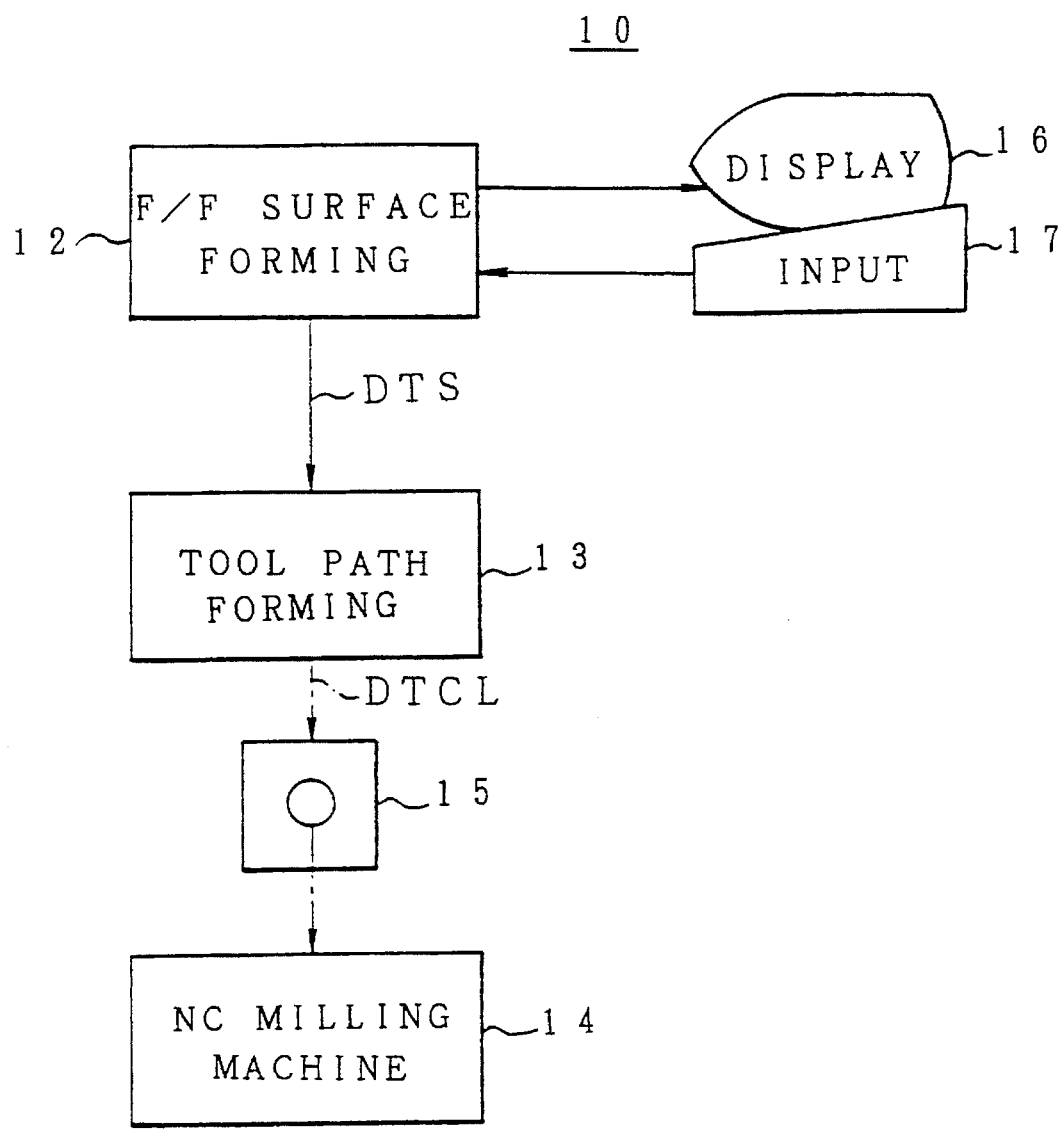
FIG. 2 is a block diagram showing the overall construction of a CAD/CAM system according to an embodiment of the present invention.

Preferred embodiments of this invention will be described with reference to the accompanying drawings: Overall Construction of CAD/CAM System Referring to FIG. 2, numeral 10 denotes a CAD/CAM system in which, after forming geometrical data DTS representing a free-form surface at a free-form surface forming unit 12, processing data DTCL for machining is formed at a tool path forming unit 13.

Specifically, the free-form surface forming unit 12 has a central processing unit (CPU). An input unit 17 is operated in response to the display on a display unit 16 to paste patches onto a wire-frame model designated and inputted by the designer, using a third order Bezier expression. Thereafter the patches are connected over again to form the geometric data DTS of an object having a free-form surface.

On the other hand, the tool path forming unit 13 forms a processing data DTCL for rough machining and finishing of a mold on the basis of the geometric data DTS and then outputs the processing data DTCL for rough machining and finishing to an NC milling machine 14, for example, by way of a floppy disk 15.

The NC milling machine 14 drives such as an NC fraise on the basis of the processing data DTCL and thereby forms a mold of the product represented by the geometric data DTS.

Theory of Free-Form Curves

Figure 3:
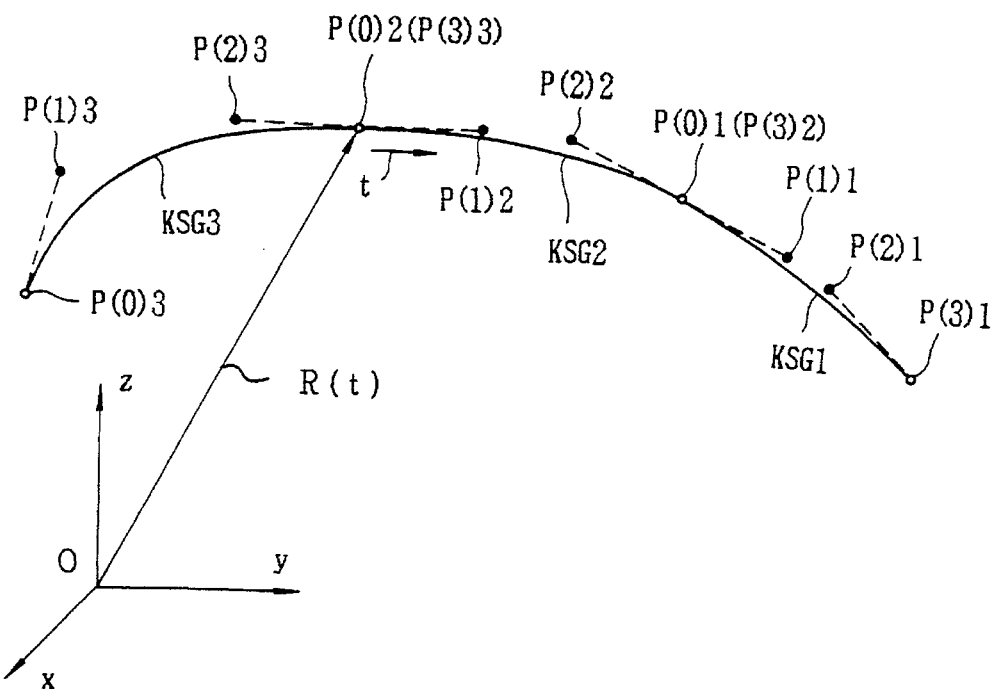
FIG. 3 is a schematic diagram for the explanation of a free-form curve.

Here, as shown in FIG. 3, a Bezier curve is represented by a parametric space curve vector R(t) which is expressed by the following formula using a third order Bezier function:

$$R(t)=(1-t+tE)^3 P0 \qquad (6)$$

Here, t is a parameter varying from value 0 to value 1 as shown in the following formula in the course from one nodal point vector P0 to the other nodal point vector P3 in the direction along curve segments KSG:

$$0 \leq t \leq 1 \qquad (7)$$

With the curve segments KSG represented in this manner by a third order Bezier expression, the respective points on the curve segments KSG are expressed as position vectors R(t) from the origin of an XYZ space by the expansion of the following formula by designating two control points, vector P1 and vector P2, between the nodal points, vector P0 and vector P3, by means of a shift operator E:

$$R(t)=(1-t)^3 P0 + 3(1-t)^2 tP1 + 3(1-t)t^2 P2 + t^3 P3 \qquad (8)$$

Here, the shift operator E is related to control points vector Pi on curve segments KSG as follows:

$$E \cdot Pi = Pi+1 \qquad (9)$$

$$i=0, 1, 2 \qquad (10)$$

Thus, a calculation is possible as shown in the following formula:

$$\begin{aligned}
R(t) &= (1-t+tE)^3 P0 \\
&= \{(1-t)^3 + 3(1-t)^2 tE + 3(1-t)t^2 E^2 + t^3 E^3\} P0 \\
&= (1-t)^3 P0 + 3(1-t)^2 tEP0 + 3(1-t)t^2 E^2 P0 + t^3 E^3 P0 \\
&= (1-t)^3 P0 + 3(1-t)^2 tP1 + 3(1-t)t^2 P2 + t^3 P3
\end{aligned} \qquad (11)$$

by expanding formula (6) and substituting the relation of formula (9) and, as a result, formula (8) is obtained.

Thus, the respective curve segments KSG1, KSG2 and KSG3 expressed by Bezier expression may be represented on the basis of formula (8) respectively by two nodal points and two control points, vector P(0)1 to vector P(0)3, vector P(1)1 to vector P(1)3, vector P(2)1 to vector P(2)3, and vector P(3)1 to vector P(3)3. And, by setting control points, vector P(1)1 to vector P(1)3 and vector P(2)1 to P(2)3, between the nodal points, vectors P(0)1 to vector P(0)3 and P(3)1, the segments may be set to a geometry which passes through the nodal points, vectors P(0)1 to vector P(0)3 and P(3)1 and is defined by the control points, vector P(0)1 to vector P(0)3, vector P(1)1 to vector P(1)3, vector P(2)1 to vector P(2)3 and vector P(3)1 to vector P(3)3.

Projection of Free-Form Curve

Figure 4:
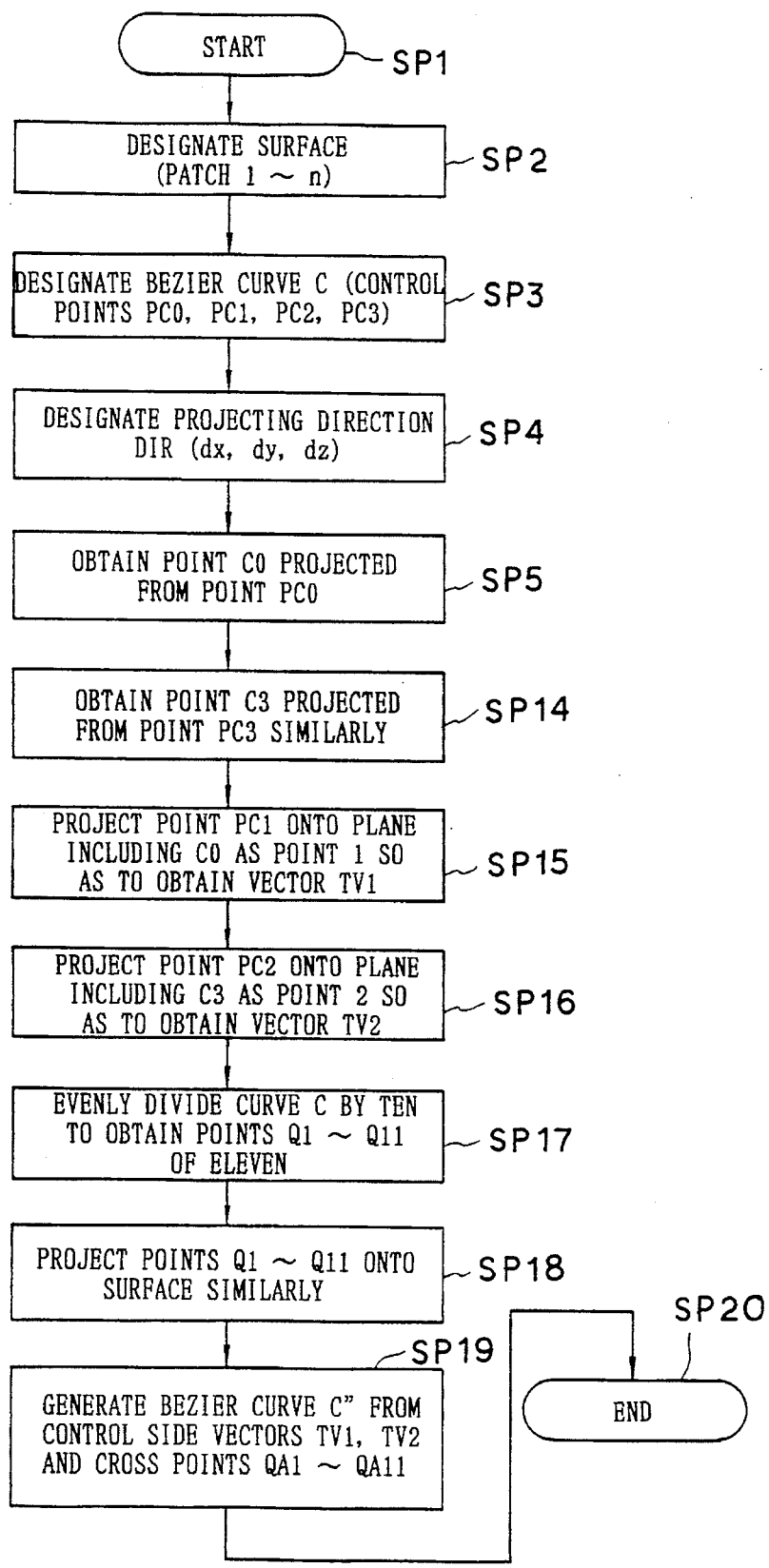
FIG. 4 is a flowchart for the explanation of curve projection.

The free-form surface forming unit 12 executes the processing procedure as shown in FIG. 4 to project a curve that has been entered by the operator onto a free-form surface and thereby generating a free-form curve on the free-form surface.

Figure 5:
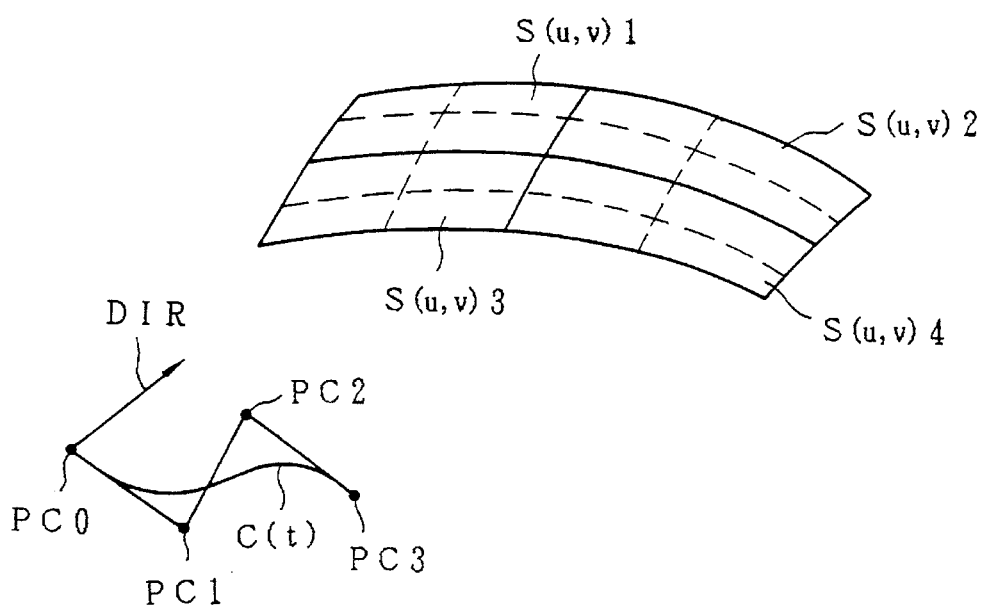
FIG. 5 is a schematic diagram showing a patch designated by the operator.

Specifically, the free-form surface forming unit 12 proceeds from step SP1 to step SP2 where, as shown in FIG. 5, when a patch vector S(u,v)1 to S(u,v)4 on which a curve is to be projected is designated by the operator, it takes in the data of the patch vector S(u,v)1 to S(u,v)4.

Subsequently, the free-form surface forming unit 12 proceeds to step SP3, where it generates a curve to be projected on the basis of the coordinate data that has been entered by the operator.

Such curve generation processing is executed for example such that the operator inputs nodal points, vector PC0 and vector PC3, internal control points, vector PC1 and vector PC2, so that a curve having a desired geometry may be obtained.

Thus input curve vector C(t) may be represented by the following formula:

$$C(t)=(1-t)^3 PC0 + 3(1-t)^2 tPC1 + 3(1-t)t^2 PC2 + t^3 PC3 \qquad (12)$$

where vector P0 to vector P3 of formula (11) are set as vector PC1 to vector PC2.

Subsequently, the free-form surface forming unit 12 proceeds to step SP4 where it takes in projecting direction DIR (dx, dy, dz) that has been entered by the operator and, then, proceeds to step SP5 where it projects the nodal point vector PC0 onto the patch vector S(u,v)1 to S(u,v)4.

Figure 6:
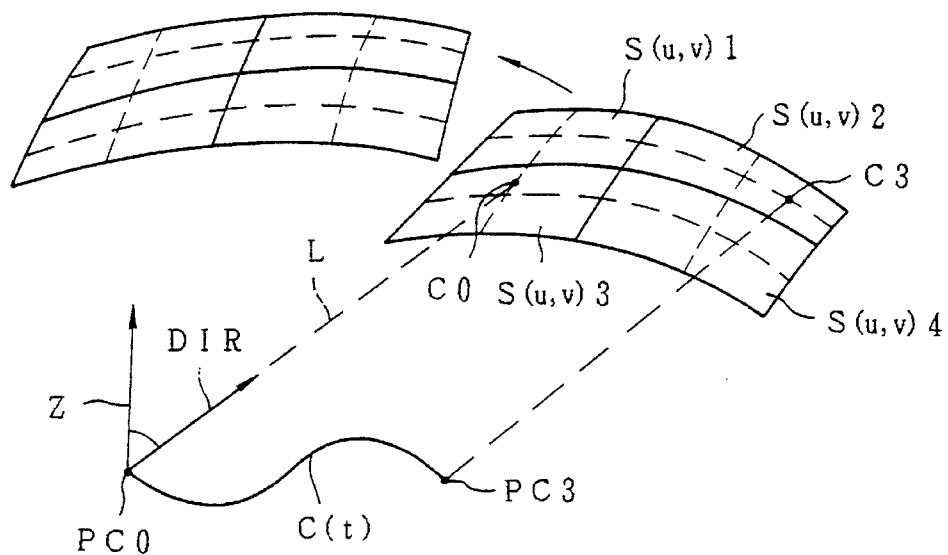
FIG. 6 is a schematic diagram for the explanation of rotation of a patch.

In this projection processing, as shown in FIG. 6, the patch vector S(u,v)1 to S(u,v)4 is successively rotated about the nodal point vector PC0 to be projected so as to make the z direction as the projecting direction DIR to judge whether projection is possible. On the basis of the judged result, the nodal point vector PC0 is projected onto a patch at the original position. Thereby, the nodal point vector PC0 may be projected by an easy calculation processing.

Figure 7:
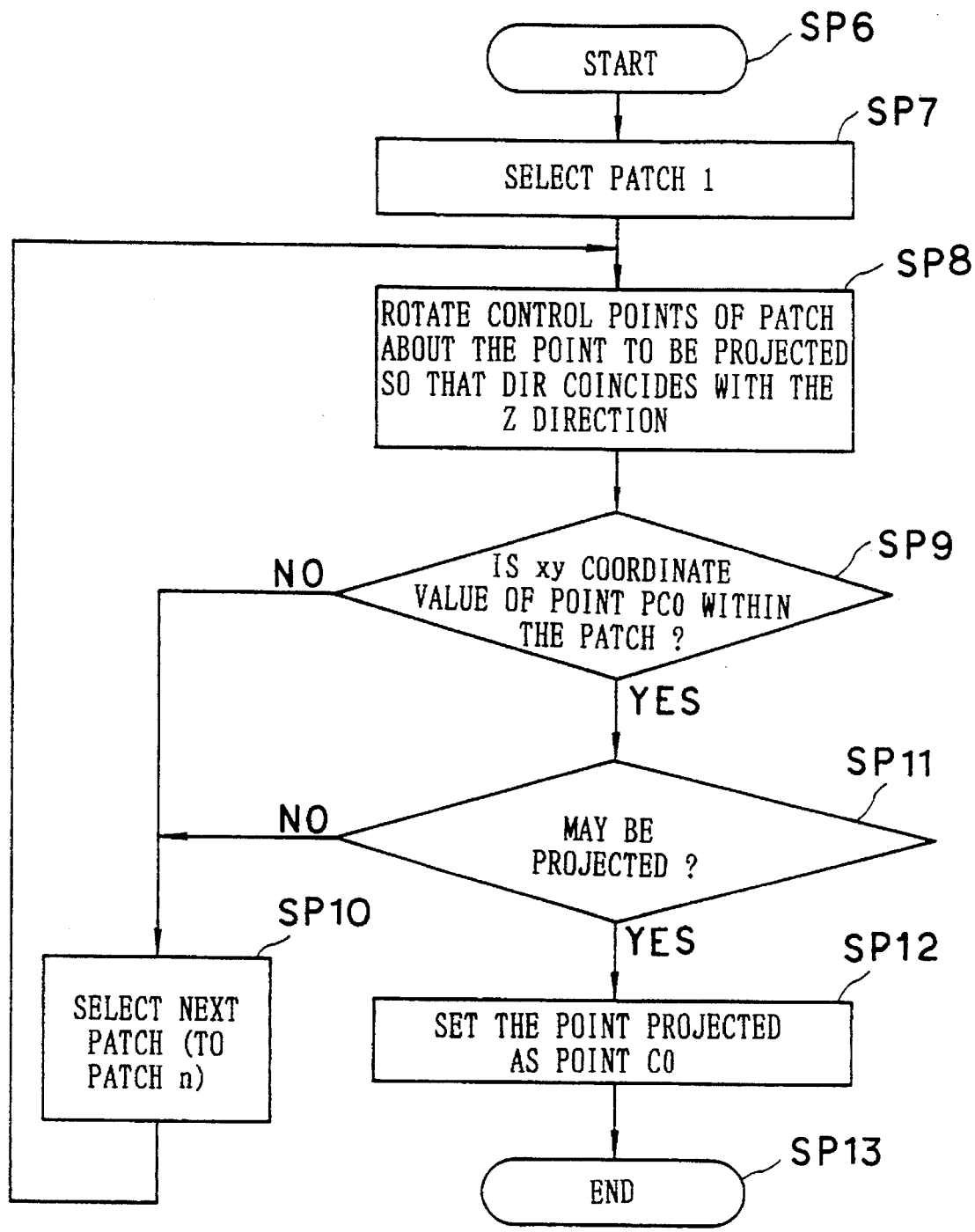
FIG. 7 is a flowchart for the explanation of projection of a point.

Specifically, as shown in FIG. 7, the free-form surface forming unit 12 proceeds from step SP6 to step SP7 of a subroutine where, at first, it selects a first patch vector S(u,v)1 and it then proceeds to step SP8.

Here, the free-form surface forming unit 12 rotates the twelve control points, vector P00 to P33 of the patch vector S(u,v)1 about the nodal point vector PC0 so that the projecting direction DIR coincides with the z direction.

Subsequently, the free-form surface forming unit 12 proceeds to step SP9 where it determines the respective minimum values and maximum values with respect to xy coordinate values of the rotated control points, vector P00 to P33, and, then, it judges whether the xy coordinate values of the nodal point vector PC0 fall under the range from the minimum value to the maximum value.

Thereby, the free-form surface forming unit 12 judges whether the xy coordinate value of the nodal point vector PC0 is within the patch vector S(u,v).

If a negative result is obtained, the free-form surface forming unit 12 proceeds to step SP10 where it selects the next second patch vector S(u,v)2 and, then, it returns to step SP8, whereby processing of steps SP8 to SP9 is repeated with respect to the patch vector s(u,v)2.

On the other hand, if an affirmative result is obtained at step SP9, the free-form surface forming unit 12 proceeds to step SP11 where it judges whether the nodal point vector PC0 may be projected onto the original patch vector S(u,v).

Specifically, the free-form surface forming unit 12 forms a straight line vector L in the projecting direction DIR from the nodal point vector PC0 and judges whether an intersecting point vector C0 is formed by the straight line vector L and the patch vector S(u,v). Thereby, it judges whether the nodal point vector PC0 may be projected onto the original patch vector S(u,v).

Here, if the intersecting point vector C0 is not formed, the free-form surface forming unit 12 proceeds to step SP10 as a negative result is obtained, and it executes processing with respect to the next patch vector S(u,v)2.

On the other hand, if an affirmative result is obtained at step SP11, the free-form surface forming unit 12 proceeds to step SP12 where it sets the intersecting point vector C0 as the nodal point and, then, it proceeds to step SP13 where the processing procedure is terminated.

Subsequently, the free-form surface forming unit 12 returns to step SP14 of FIG. 4 where, in a similar manner, it projects the remaining nodal point PC3 onto the patch vectors S(u,v)1 to S(u,v)4 and sets the resulted intersecting point vector C3 as a nodal point.

If, at this time, an intersecting point, vector C0 or vector C3, cannot be formed on any of the patches, vector S(u,v)1 to S(u,v)4, at the free-form surface forming unit 12, the free-form curve vector C(t) is sequentially followed inwardly from the corresponding nodal point vector PC0 or vector PC3 to form a point for projection on the free-form curve vector C(t).

Further, by executing the processing procedure as shown in FIG. 7 with respect to that point, the intersecting point of the point is set as the nodal point vector C0 or vector C3 instead of the nodal point vector PC0 or vector PC3.

Subsequently, the free-form surface forming unit 12 proceeds to step SP15, where it generates a control side vector, vector TV1, with respect to the nodal point vector C0.

Figure 8:
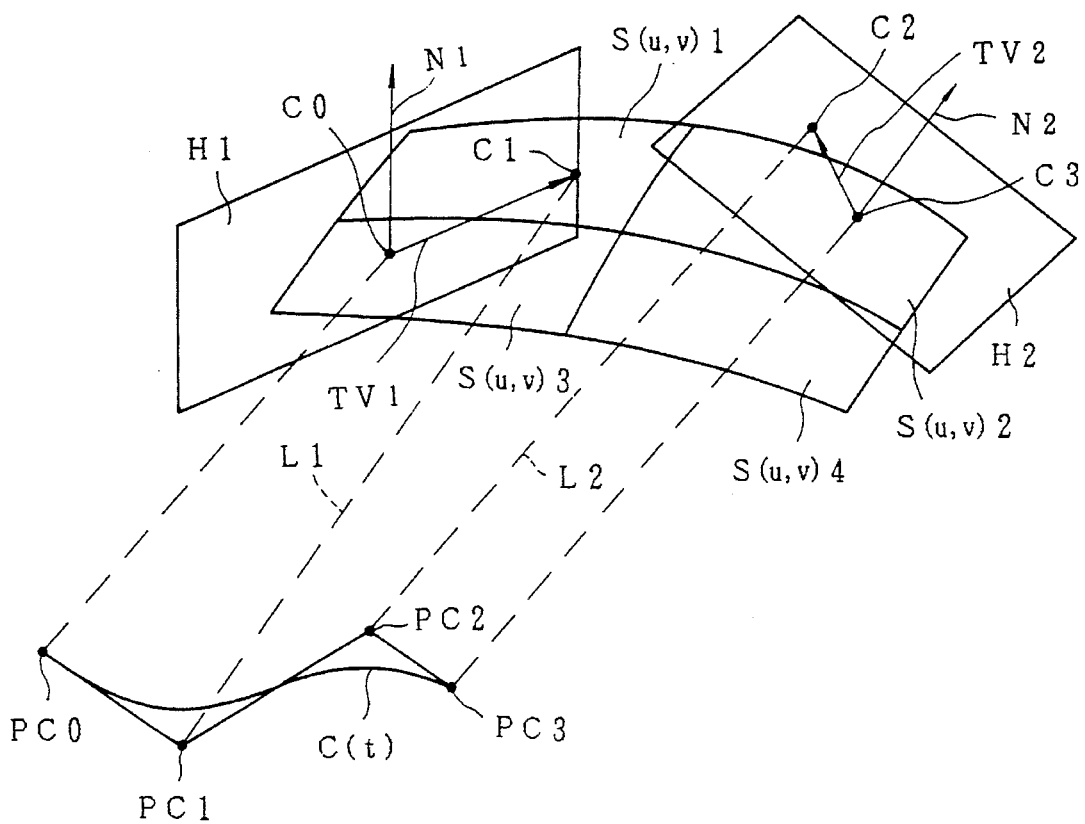
FIG. 8 is a schematic diagram for the explanation of control side vector generation.

That is, as shown in FIG. 8, the free-form surface forming unit 12 sets a normal vector N1 of the patch vector S(u,v)1 at the nodal point vector PC0 and, then, forms a plane vector H1 which includes the normal line vector N1 as a normal line.

Further, the free-form surface forming unit 12 forms a straight line vector L1 in the projecting direction DIR from the control point vector PC1 of the free-form curve vector C(t) and detects the intersecting point vector C1 of the straight line vector L1 and the plane vector H1.

Thereby, the free-form surface forming unit 12 executes the calculation processing of the following formula:

$$TV1 = C1 - C0 \tag{13}$$

to generate a control side vector, vector TV1, in the direction connecting the nodal point vector C0 and the intersecting point vector C1.

Subsequently, the free-form surface forming unit 12 proceeds to step SP16 where it executes processing similar to step SP15 and executes the calculation processing of the following formula:

$$TV2 = C2 - C3 \tag{14}$$

to generate a control side vector, vector TV2, in the direction connecting the nodal point vector C3 and the intersecting point vector C2.

Subsequently, the free-form surface forming unit 12 proceeds to step SP17 where a series of points for projection are formed on the free-form curve vector C(t).

That is, at the free-form surface forming unit 12, parameter t of the free-form curve vector C(t) is divided into ten equal points and the parameters t is successively substituted in formula (11) to generate eleven points, vector Q1 to vector Q11, represented by the following formula:

$$\begin{aligned} Q1 &= C(0.0) \\ Q2 &= C(0.1) \\ Q3 &= C(0.2) \\ &\vdots \\ Q11 &= C(1.0) \end{aligned} \tag{15}$$

Subsequently, the free-form surface forming unit 12 proceeds to step SP18, where processing similar to step SP5 is executed to project the points vector Q1 to Q11 successively onto the patch vector S(u,v)1 to vector S(u,v)4.

Figure 9:
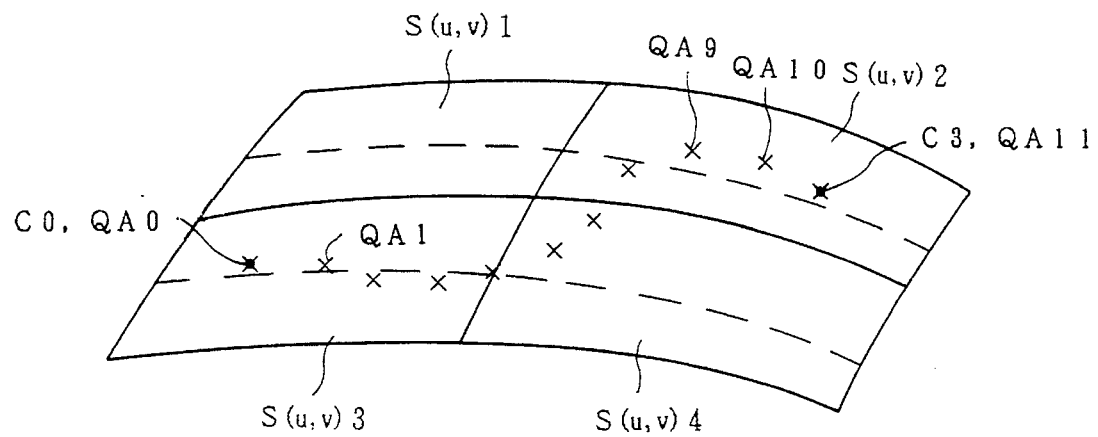
FIG. 9 is a schematic diagram for the explanation of generation of intersecting points.

Thereby, as shown in FIG. 9, the free-form surface forming unit 12 generates the intersecting points, vector QA1 to vector QA11 corresponding to the points, vector Q1 to vector Q11, successively on the patch vector S(u,v)1 to S(u,v)4.

Thus, by successively rotating the respective patches, vectors S(u,v)1 to S(u,v)4, in the z direction and by judging whether projection is possible on the basis of xy coordinate values of the control points vector P00 to P33 of the respective patches, vectors S(u,v)1 to S(u,v)4, the series of points vector Q1 to Q11 may readily be projected. Accordingly, Bezier curve vector C may readily be generated.

Figure 10:
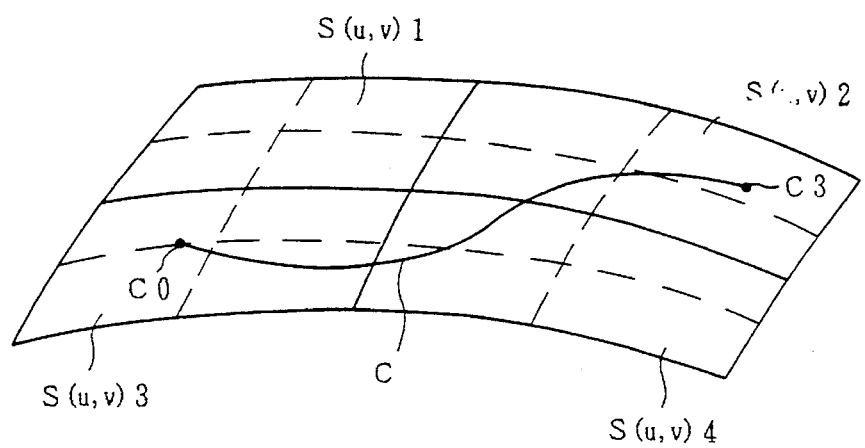
FIG. 10 is a schematic diagram for the explanation of Bezier curve generation.

Upon generating the intersecting points, vector QA1 to QA11, in this manner, the free-form surface forming unit 12 proceeds to step SP19 where, as shown in FIG. 10, the Bezier curve vector C is generated from the control side vectors, vector TV1 and vector TV2, and the intersecting points vector QA1 to QA11.

In this generation processing, as indicated by the following formulas:

$$P0 = QA1 \tag{16}$$

$$P1 = QA1 + TV1 * a \tag{17}$$

$$P2 = QA11 + TV2 * b \tag{18}$$

$$P3 = QA11 \tag{19}$$

the free-form surface forming unit 12 sets the intersecting points, vectors QA1 and vector QA11, at the both ends respectively as nodal points vectors P0 and P3 and sets the control points vectors P1 and P2 in the extended direction of the control side vectors, vector TV1 and vector TV2, from the nodal points vectors P0 and P3.

Thereby, the free-form surface forming unit 12 uses the nodal points vectors P0 and P3 and the control points vectors P1 and P2 to temporarily set a Bezier curve vector R(t) represented by the following formula:

$$R(t) = (1-t)^3 P0 + 3(1-t)^2 t P1 + 3(1-t) t P2 + t^3 P3 \tag{20}$$

where "a" and "b" are preset initial values.

Subsequently, by executing the calculation processing of the following formula:

$$F = \sum_{i=1}^{11} \{(R(ti)x - QAix)^2 + (R(ti)y - QAiy)^2 + (R(ti)z - QAiz)^2\} \quad (21)$$

the free-form surface forming unit 12 obtains the sum of squares F of the shortest distances from the respective intersecting points, vector QA1 to vector QA11, to the Bezier curve vector R(t) and sets control points vectors P1 and P2 of the Bezier curve R(t) so that the sum of squares F is minimized.

That is, if formula (21) is differentiated respectively with the initial values a and b and the value 0 is assumed, the following formulas may be obtained:

$$\frac{df}{da} = \sum_{i=1}^{11} \left\{ \left( R(ti)x - QAix \frac{dRx}{da} + (R(ti)y - QAiy \frac{dRy}{da} \right) + \left( R(ti)z - QAiz \frac{dRz}{da} \right) \right\} = 0 \quad (22)$$

$$\frac{df}{db} = \sum_{i=1}^{11} \left\{ \left( R(ti)x - QAix \frac{dRx}{db} + (R(ti)y - QAiy \frac{dRy}{db} \right) + \left( R(ti)z - QAiz \frac{dRz}{db} \right) \right\} = 0 \quad (23)$$

Thus, if formulas (22), (23) are expanded to Taylor series to omit the second-order terms and after, the relation expressed by the following formulas:

$$\sum_{i=1}^{11} \left\{ \left( R(ti)x + \frac{dRx}{da} \Delta a + \frac{dRx}{db} \Delta b - QAix \right) \frac{dRx}{da} + \left( R(ti)y + \frac{dRy}{da} \Delta a + \frac{dRy}{db} \Delta b - QAiy \right) \frac{dRy}{da} + \left( R(ti)z + \frac{dRz}{da} \Delta a + \frac{dRz}{db} \Delta b - QAiz \right) \frac{dRz}{da} \right\} = 0 \quad (24)$$

$$\sum_{i=1}^{11} \left\{ \left( R(ti)x + \frac{dRx}{db} \Delta a + \frac{dRx}{db} \Delta b - QAix \right) \frac{dRx}{db} + \left( R(ti)y + \frac{dRy}{db} \Delta a + \frac{dRy}{db} \Delta b - QAiy \right) \frac{dRy}{db} + \left( R(ti)z + \frac{dRz}{db} \Delta a + \frac{dRz}{db} \Delta b - QAiz \right) \frac{dRz}{db} \right\} = 0 \quad (25)$$

is obtained.

Thus, this may be represented by a matrix as follows:

$$\begin{pmatrix} \Sigma \left( \frac{dRx}{da} \frac{dRx}{da} + \frac{dRy}{da} \frac{dRy}{da} + \frac{dRz}{da} \frac{dRz}{da} \right) \\ \Sigma \left( \frac{dRx}{da} \frac{dRx}{db} + \frac{dRy}{da} \frac{dRy}{db} + \frac{dRz}{da} \frac{dRz}{db} \right) \\ \Sigma \left( \frac{dRx}{db} \frac{dRx}{da} + \frac{dRy}{db} \frac{dRy}{da} + \frac{dRz}{db} \frac{dRz}{da} \right) \\ \Sigma \left( \frac{dRx}{db} \frac{dRx}{db} + \frac{dRy}{db} \frac{dRy}{db} + \frac{dRz}{db} \frac{dRz}{db} \right) \end{pmatrix} \begin{pmatrix} \Delta a \\ \Delta b \end{pmatrix} = \begin{pmatrix} -\Sigma \left\{ (R(ti)x - QAix) \frac{dRx}{da} + (R(ti)y - QAiy) \frac{dRy}{da} + (R(ti)z - QAiz) \frac{dRz}{da} \right\} \\ -\Sigma \left\{ (R(ti)x - QAix) \frac{dRx}{db} + (R(ti)y - QAiy) \frac{dRy}{db} + (R(ti)z - QAiz) \frac{dRz}{db} \right\} \end{pmatrix} \quad (26)$$

and, thereby, the values $\Delta a$ and $\Delta b$ may be obtained by applying the Newton-Raphson method.

In this manner, at the free-form curve forming unit 12, thus obtained values $\Delta a$ and $\Delta b$ are added to the initial values a and b and the calculation processing of formula (26) is repeated, thereby determining the final values of a and b.

Subsequently, at the free-form curve forming unit 12, the final values of a and b are substituted in formulas (17) and (18) to determine the control points, vectors P1 and P2, and thereby a Bezier curve vector C passing through the intersecting points, vector QA1 to vector QA11 is generated. Thereafter it proceeds to step SP20 where the processing procedure is terminated.

Thereby, it is possible at the free-form curve forming unit 12 to generate the Bezier curve vector C which is obtained by projecting the free-form curve vector C(t) onto the surface, vector S(u,v)1 to S(u,v)4.

In this manner, control side vectors, vector TV1 and vector TV2, are previously set and control side vectors, vector TV1 and vector TV2, are used to generate the Bezier curve vector C. Thus, calculation processing readily possible by applying the Newton-Raphson method and, accordingly, the total calculation processing time may be reduced.

At this time, at the free-form curve forming unit 12, on the basis of a series of points, vector Q1 to vector Q11, the Bezier curve vector C is generated so that it passes through the intersecting points, vector QA1 to vector QA11, on the surface vector S(u,v)1 to S(u,v)4. Thereby, the Bezier curve vector C which is smooth and highly accurate may be generated.

Further, since control side vectors, vector TV1 and vector TV2, are used to generate Bezier curve C, the state of tangential continuity may be retained in the Bezier curve vector C when the patches, vector S(u,v)1 to S(u,v)4, are connected to each other to satisfy the condition of continuity of tangential planes.

Thus, a conventional processing procedure such as of modification of free-form curve may be applied to the Bezier curve vector C, and, accordingly, the operability of the free-form curve forming unit may be improved.

Further, it is possible to observe the state after boring or to readily observe the state after grooving.

Figure 11:
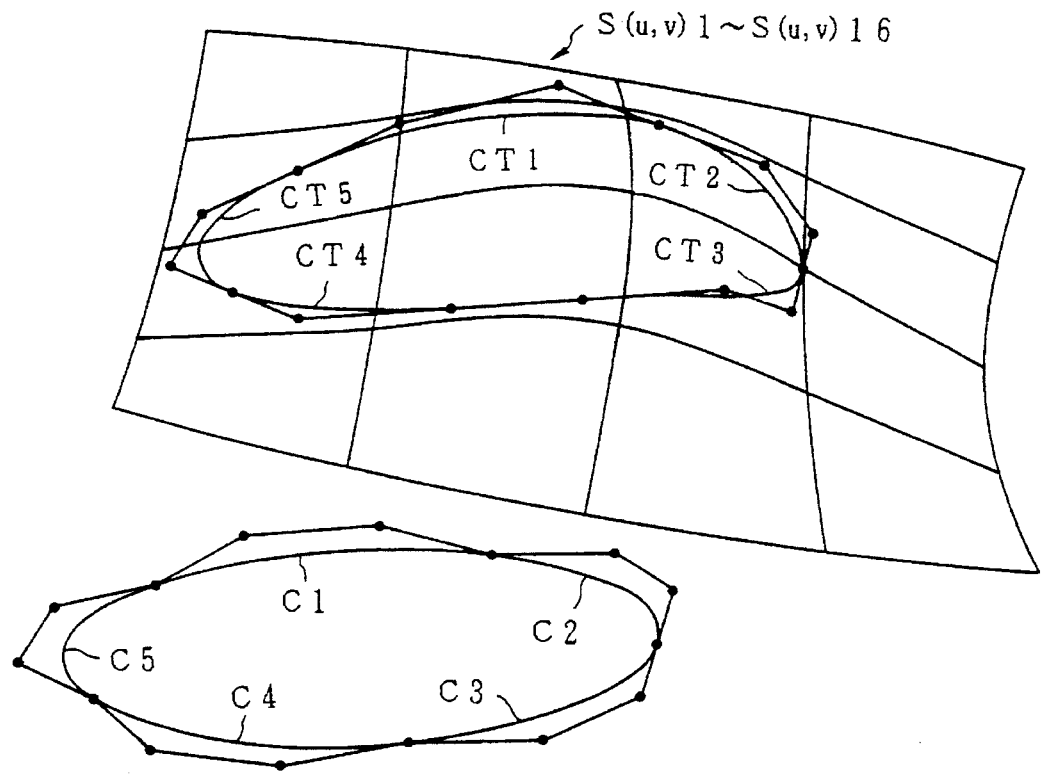
FIG. 11 is a schematic diagram showing actual processing.

In an actual example, as shown in FIG. 11, according to the result of an experiment where a free-form surface formed by connecting five Bezier curves, vector C1 to vector C5, in the manner of a ring was projected onto the free-form surface constructed by the patches, vector S(u,v)1 to S(u,v)16, it was possible in a short time period to generate Bezier curves, vector CT1 to vector CT5, connected by the condition of tangential continuity on the patches, vector S(u,v)1 to S(u,v)16.

In accordance with the construction as described: it is judged whether projection is possible by rotating the respective patches so as to make the projecting direction the z direction; on the basis of the judged result, a series of points on a curve and control points are projected onto the patches; the intersecting points thus obtained on the surface are used to generate control side vectors to form a Bezier curve. Thereby a desired curve may readily be projected onto a free-form surface, and, accordingly, it is possible to improve the efficiency of designing operation and to improve the operability of the designing device.

Generation of Patch

Figure 12:
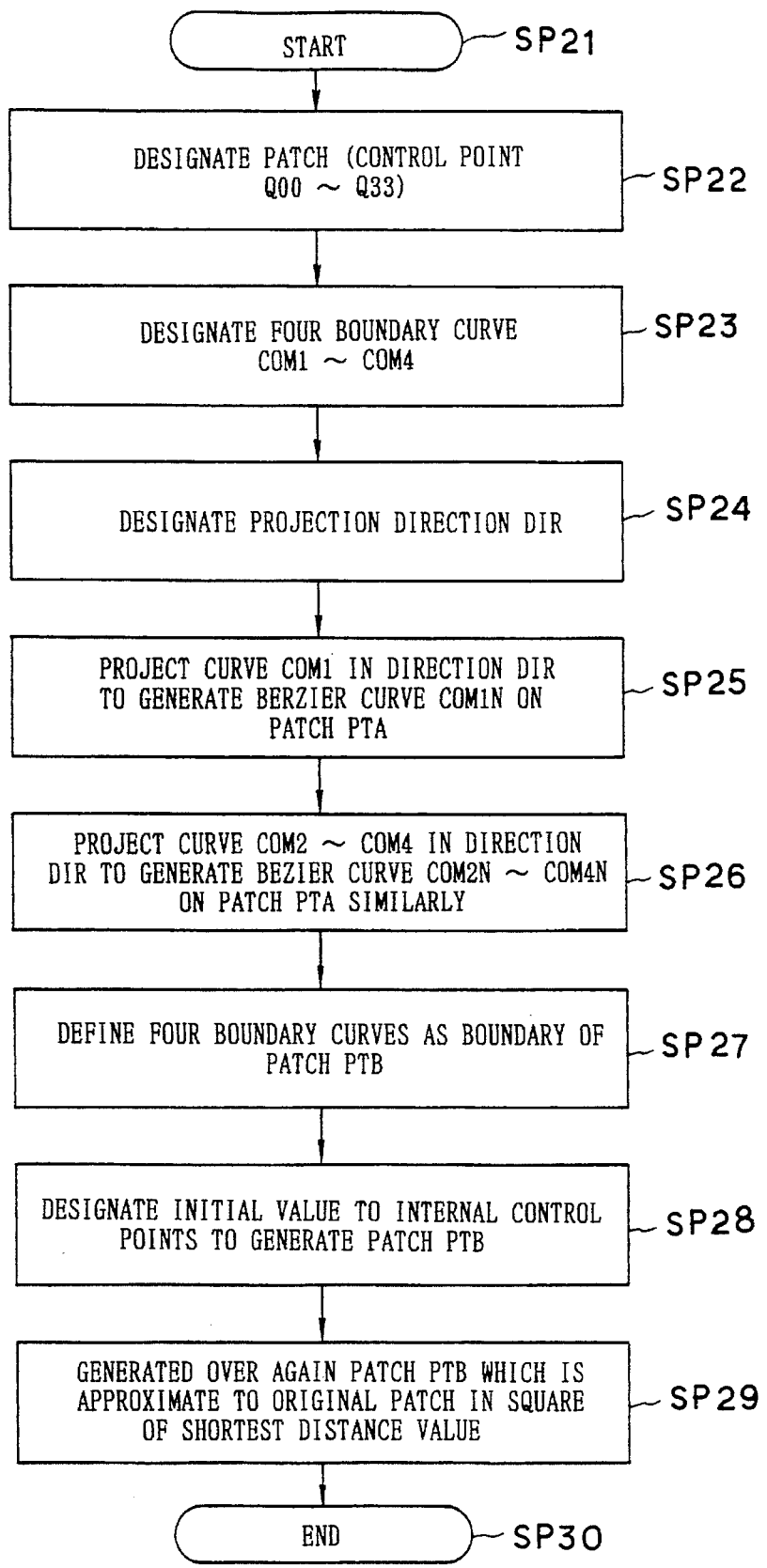
FIG. 12 is a flowchart showing the processing procedure for generating a patch by projecting boundary curves.

The free-form surface forming unit 12 executes the processing procedure as shown in FIG. 12 by applying the technique of free-form curve projection as described to form a framing space on a patch desired by the operator and to generate a patch having the same surface geometry as the desired patch on the framing space.

Thus, the free-form surface forming unit 12 is constructed to be capable of designing the geometry of parts from the entire geometry of a designed product or not verifying the state where a seal is pasted onto the surface.

Figure 13:
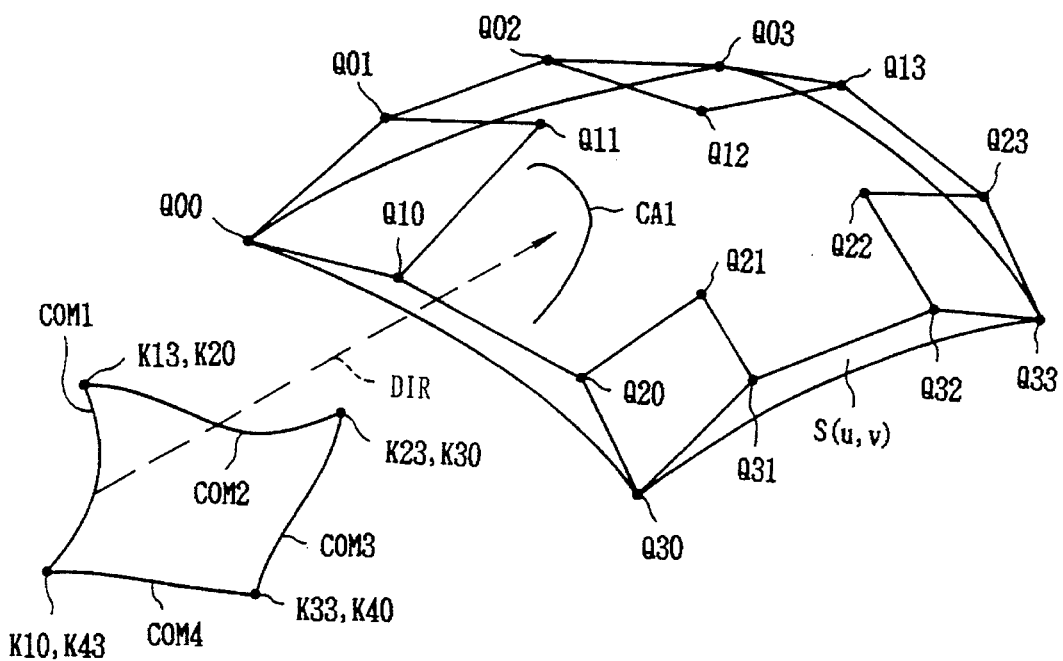
FIG. 13 is a schematic diagram for the explanation of data input.

Specifically, the free-form surface forming unit 12 proceeds from step SP21 to step SP22 where it takes in the coordinate data of control points, vector Q00 to vector Q33, with respect to the patch vector S(u,v) (patch A) designated by the operator, as shown in FIG. 13, and then, it proceeds to step SP23.

Here, the free-form surface forming unit 12 takes in the coordinate data of the control points, vector K10 to vector K13, vector K20 to vector K23, vector K30 to vector K33, vector K40 to vector K43, with respect to boundary curves COM1 to COM4 which the operator desires to project onto the patch vector S(u,v), and, subsequently at step SP24, the projecting direction DIR is inputted.

It should be noted that, for the boundary curves COM1 to COM4, the respective control points, vector K10 to vector K13, vector K20 to vector K23, vector K30 to vector K33 and vector K40 to vector K43, are used to represent them by vector functions, vector L1(t), vector L2(t), vector L3(t) and vector L4(t), as indicated by the following formulas:

$$L1(t)=(1-t)^3 K10+3(1-t)^2 tK11+3(1-t)t^2 K12+t^3 K13 \qquad (27)$$

$$L2(t)=(1-t)^3 K20+3(1-t)^2 tK21+3(1-t)t^2 K22+t^3 K23 \qquad (28)$$

$$L3(t)=(1-t)^3 K30+3(1-t)^2 tK31+3(1-t)t^2 K32+t^3 K33 \qquad (29)$$

$$L4(t)=(1-t)^3 K40+3(1-t)^2 tK41+3(1-t)t^2 K42+t^3 K43 \qquad (30)$$

Subsequently, the free-form surface forming unit 12 proceeds to step SP25 where, at first, the boundary curve COM1 is projected onto the patch vector PTA.

In this projection processing, the processing procedure described above with reference to FIG. 4 is executed to generate a Bezier curve vector CA1 obtained by projecting the boundary curve COM1 onto the patch vector S(u,v).

Subsequently, the free-form surface forming unit 12 proceeds to step SP26 where, in a similar manner, the boundary curves COM2 to COM4 are projected onto the patch vector PTA.

Figure 14:
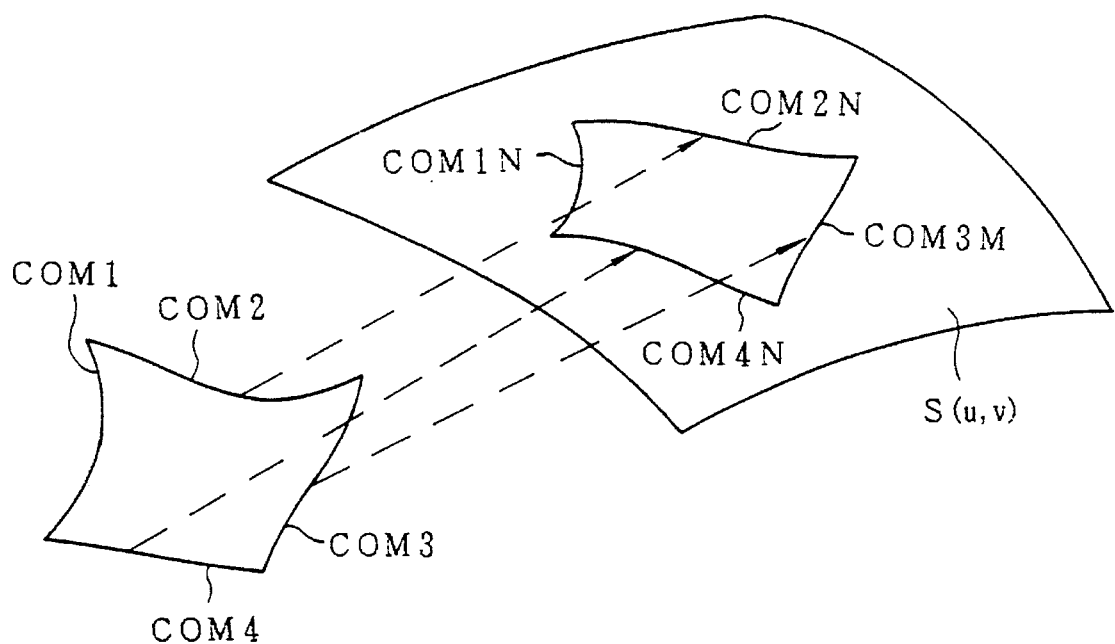
FIG. 14 is a schematic diagram for the explanation of projection of boundary curves.

Thereby, the free-form surface forming unit 12 uses the control points, vector K10 to vector K13, vector K20 to vector K23, vector K30 to vector K33 and vector K40 to vector K43, to generate on the patch vector PTA free-form curves represented by the vector functions, vector LA1(t), vector LA2(t), vector LA3(t) and vector LA4(t), of the following formulas:

$$LA1(t)=(1-t)^3 KA10+3(1-t)^2 tKA11+3(1-t)t^2 KA12+t^3 KA13 \qquad (31)$$

$$LA2(t)=(1-t)^3 KA20+3(1-t)^2 tKA21+3(1-t)t^2 KA22+t^3 KA23 \qquad (32)$$

$$LA3(t)=(1-t)^3 KA30+3(1-t)^2 tKA31+3(1-t)t^2 KA32+t^3 KA33 \qquad (33)$$

$$LA4(t)=(1-t)^3 KA40+3(1-t)^2 tKA41+3(1-t)t^2 KA42+t^3 KA43 \qquad (34)$$

and it proceeds to step SP27 where the free-form curves are set as the boundary curves COM1N to COM4N as shown in FIG. 14.

In this manner, it is judged whether projection is possible by rotating the patch vector S(u,v) and, on the basis of the judged result, the free-form curves are projected. Thereby, the boundary curves COM1 to COM4 may readily be projected onto the patch vector S(u,v).

Thus, a framing space may readily be formed on the patch vector S(u,v). Accordingly, the operability of the free-form surface forming unit 12 may be improved by using it such as for modification of framing process or verification of design.

Figure 15:
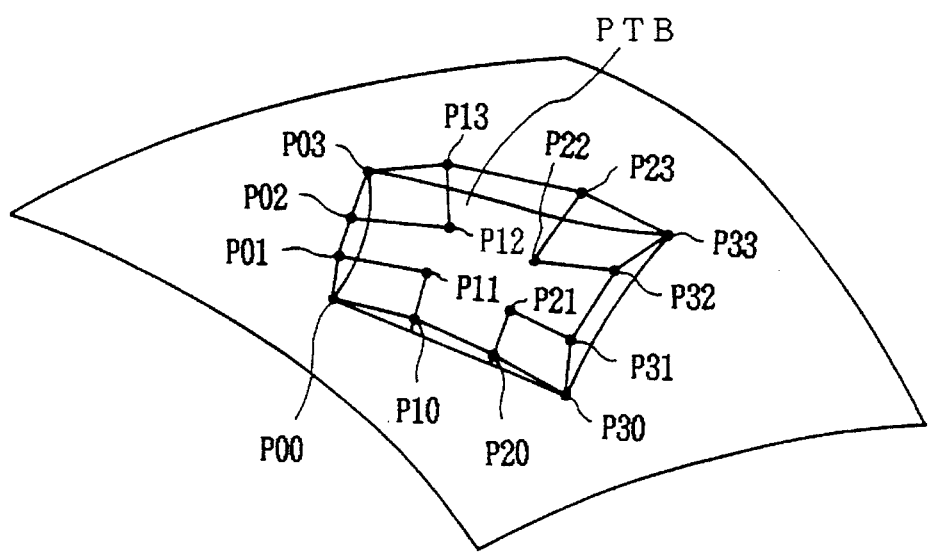
FIG. 15 is a schematic diagram for the explanation of temporary generation of a patch.

Subsequently, the free-form surface forming unit 12 proceeds to step SP28 where, as shown in FIG. 15, a patch vector PTB is temporarily generated in the framing space bounded by the boundary curves COM1N to COM4N.

That is, the free-form surface forming unit 12 sets the internal control points, vector P11, vector P12, vector P21 and vector P22, on the framing space as indicated by the following formulas:

$$P11=P01+P10-P00 \qquad (35)$$

$$P12=P02+P13-P03 \qquad (36)$$

$$P21=P20+P31-P30 \qquad (37)$$

$$P22=P23+P32-P33 \qquad (38)$$

Here, the control points, vector P00 to vector P33, are retained to have the relation of the following formula:

$$P00=KA10, P10=KA11, P20=KA12, P30=KA13$$

$$P01=KA20, P31=KA30$$

$$P02=KA30, P32=KA33$$

$$P03=KA40, P13=KA41, P23=KA42, P33=KA43 \qquad (39)$$

and thereby the free-form surface forming unit 12 uses the control points, vector KA10 to vector KA43, of the boundary curves COM1N to COM4N to temporarily generate the patch vector PTB.

Subsequently, the free-form surface forming unit 12 proceeds to step SP29 where the surface geometry of the patch vector PTB is transformed into the patch vector S(u,v).

That is, the patch vector S(u,v) may be represented by the following formula:

$$\begin{aligned} S(u,v) = \ & (1-u)^3(1-v)^3 Q00 + (1-u)^3 3(1-v)^2 v Q10 + \\ & (1-u)^3 3(1-v)v^2 Q20 + (1-u)^3 v^3 Q30 + \\ & 3(1-u)^2 u(1-v)^3 Q01 + 3(1-u)^2 u 3(1-v)^2 v Q11 + \\ & 3(1-u)^2 u 3(1-v)v^2 Q21 + 3(1-u)^2 u v^3 Q31 + \\ & 3(1-u)u^2(1-v)^3 Q02 + 3(1-u)u^2 3(1-v)^2 v Q12 + \\ & 3(1-u)u^2 3(1-v)v^2 Q22 + 3(1-u)u^2 v^3 Q32 + \\ & u^3(1-v)^3 Q03 + u^3 3(1-v)^2 v Q13 + \\ & u^3 3(1-v)v^2 Q23 + u^3 v^3 Q33 \end{aligned} \qquad (40)$$

by expanding formula (1) and substituting the control points, vector Q00 to vector Q33, for the control points, vector P00 to vector P33.

On the other hand, the patch vector PTB may be represented using the vector function R(u,v) by the following formula:

$$R(u,v) = (1-u)^3(1-v)^3 P00 + (1-u)^33(1-v)^2 vP10 + \qquad (41)$$
$$(1-u)^33(1-v)v^2 P20 + (1-u)^3 v^3 P30 +$$
$$3(1-u)^2 u(1-v)^3 P01 + 3(1-u)^2 u3(1-v)^2 vP11 +$$
$$3(1-u)^2 u3(1-v)v^2 P21 + 3(1-u)^2 uv^3 P31 +$$
$$3(1-u)u^2(1-v)^3 P02 + 3(1-u)u^23(1-v)^2 vP12 +$$
$$3(1-u)u^23(1-v)v^2 P22 + 3(1-u)u^2 v^3 P32 +$$
$$u^3(1-v)^3 P03 + u^33(1-v)^2 vP13 +$$
$$u^33(1-v)v^2 P23 + u^3 v^3 P33$$

and, by putting this in order, it may be represented by the following formula:

$$\begin{aligned}R(u,v) = \ & drp00 \cdot P00 + drp10 \cdot P10 + drp20 \cdot P20 + \\ & drp30 \cdot P30 + drp01 \cdot P01 + drp11 \cdot P11 + \\ & drp21 \cdot P21 + drp31 \cdot P31 + drp02 \cdot P02 + \\ & drp12 \cdot P12 + drp22 \cdot P22 + drp32 \cdot P32 + \\ & drp03 \cdot P03 + drp13 \cdot P13 + drp23 \cdot P23 + \\ & drp33 \cdot P33\end{aligned} \qquad (42)$$

where drp00 to drp33 are retained in the relation of the following formula:

$$drp00 = (1-u)^3(1-v)^3$$
$$drp10 = (1-u)^3 3(1-v)^2 v$$
$$drp20 = (1-u)^3 3(1-v)v^2$$
$$drp30 = (1-u)^3 v^3$$
$$drp01 = 3(1-u)^2 u(1-v)^3$$
$$drp11 = 3(1-u)^2 u3(1-v)^2 v$$
$$drp21 = 3(1-u)^2 u3(1-v)v^2$$
$$drp31 = 3(1-u)^2 uv^3$$
$$drp02 = 3(1-u)u^2(1-v)^3$$
$$drp12 = 3(1-u)u^2 3(1-v)^2 v$$
$$drp22 = 3(1-u)u^2 3(1-v)v^2$$
$$drp32 = 3(1-u)u^2 v^3$$
$$drp03 = u^3(1-v)^3$$
$$drp13 = u^3 3(1-v)^2 v$$
$$drp23 = u^3 3(1-v)v^2$$
$$drp33 = u^3 v^3 \qquad (43)$$

Figure 16:
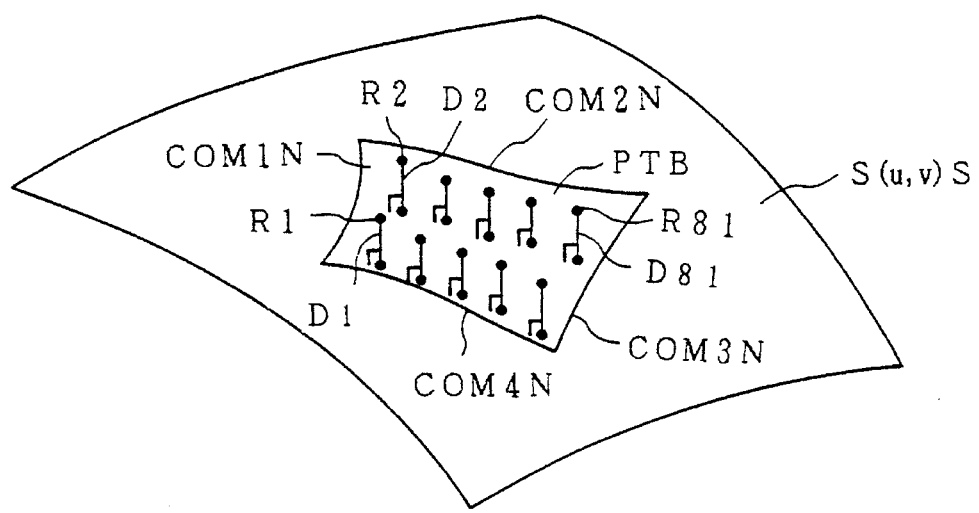
FIG. 16 is a schematic diagram for the explanation of transformation of a patch.
Figure 17:
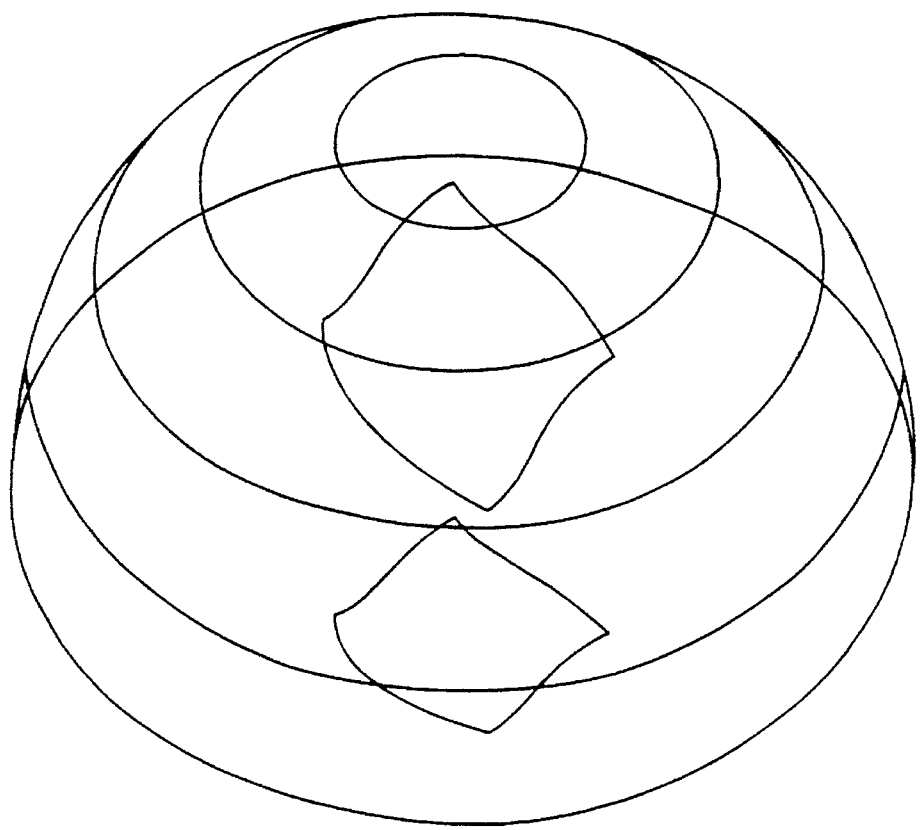
FIG. 17 is a schematic diagram showing a patch actually processed.

Here, as shown in FIG. 16, the free-form surface forming unit 12 sets on the patch vector PTB a group of points represented by vector R1(0.1,0.1), vector R2(0.1,0.2), vector R3(0.1,0.3), ..., vector R80(0.9,0.8), vector R81(0.9,0.9), by dividing the parameters u, v of the patch vector PTB into ten equal parts and substituting in formula 42.

Further, perpendiculars are drawn from the respective points, vector R1(0.1,0.1) to vector R81(0.9,0.9), to the patch vector S(u,v) to find the intersecting points. Thereby, the shortest distances D1 to D81 from the respective points, vector R1(0.1,0.1) to vector R81(0.9,0.9) to the patch vector S(u,v) are obtained.

Further, the free-form surface forming unit 12 finds the sum of squares of the shortest distances D1 to D81 by executing the calculation processing of the following formula:

$$\sum_{i=1}^{81} Di^2 = \sum_{i=1}^{81} \{(Ri(ui,vi)x - Six)^2 + \qquad (44)$$
$$(Ri(ui,vi)y - Siy)^2 + (Ri(ui,vi)z - Siz)^2\}$$

Note that Ri(ui,vi)x, Ri(ui,vi)y, Ri(ui,vi)z and Six, Siy, Siz represent x, y, z coordinate values of the points, vector R1(0.1,0.1) to vector R81(0.9,0.9) and the intersecting points, respectively.

Here, supposing that the internal control points, vector P11, vector P12, vector P21 and vector P22, are respectively represented by the following formula:

$$P11 = (x11, y11, z11)$$
$$P12 = (x12, y12, z12)$$
$$P21 = (x21, y21, z21)$$
$$P22 = (x22, y22, z22) \qquad (45)$$

the sum of squares of the shortest distances D1 to D81 may be represented by a function F using x, y, z coordinate values of the internal control points, vector P11 to vector P22 as variables, as indicated by the following formula:

$$F(x11,y11,z11,x12,y12,z12,x21,y21,z21,x22,y22,z22) = \sum_{i=1}^{81} Di^2 \qquad (46)$$

and in this case, it is seen that, if the x, y, z coordinate values are selected so that the function takes its minimum value, the surface geometry of the patch vector PTB may be transformed into the surface geometry of the patch vector S(u,v).

Here, if formula (46) is differentiated with the respective variables and is set to 0, the relation of the following formulas:

$$\frac{dF}{dx11} = \sum_{i=1}^{81} \left\{ (Ri(ui,vi)x - Six) \frac{dRx}{dx11} \right\} = 0 \qquad (47)$$

$$\frac{dF}{dy11} = \sum_{i=1}^{81} \left\{ (Ri(ui,vi)y - Siy) \frac{dRy}{dy11} \right\} = 0 \qquad (48)$$

$$\frac{dF}{dz11} = \sum_{i=1}^{81} \left\{ (Ri(ui,vi)z - Siz) \frac{dRz}{dz11} \right\} = 0 \qquad (49)$$

$$\frac{dF}{dx12} = \sum_{i=1}^{81} \left\{ (Ri(ui,vi)x - Six) \frac{dRx}{dx12} \right\} = 0 \qquad (50)$$

$$\frac{dF}{dy12} = \sum_{i=1}^{81} \left\{ (Ri(ui,vi)y - Siy) \frac{dRy}{dy12} \right\} = 0 \qquad (51)$$

$$\frac{dF}{dz12} = \sum_{i=1}^{81} \left\{ (Ri(ui,vi)z - Siz) \frac{dRz}{dz12} \right\} = 0 \qquad (52)$$

$$\frac{dF}{dx21} = \sum_{i=1}^{81} \left\{ (Ri(ui,vi)x - Six) \frac{dRx}{dx21} \right\} = 0 \qquad (53)$$

$$\frac{dF}{dy21} = \sum_{i=1}^{81} \left\{ (Ri(ui,vi)y - Siy) \frac{dRy}{dy21} \right\} = 0 \qquad (54)$$

$$\frac{dF}{dz21} = \sum_{i=1}^{81} \left\{ (Ri(ui,vi)z - Siz) \frac{dRz}{dz21} \right\} = 0 \qquad (55)$$

$$\frac{dF}{dx22} = \sum_{i=1}^{81} \left\{ (Ri(ui,vi)x - Six) \frac{dRx}{dx22} \right\} = 0 \qquad (56)$$

$$\frac{dF}{dy22} = \sum_{i=1}^{81} \left\{ (Ri(ui,vi)y - Siy) \frac{dRy}{dy22} \right\} = 0 \qquad (57)$$

-continued
$$\frac{dF}{dz22} = \sum_{i=1}^{81} \left\{ (Ri(ui,vi)z - Siz) \frac{dRz}{dz22} \right\} = 0 \tag{58}$$

may be obtained.

On the other hand, for dRx/dx11 to dRz/dz22, the relation of the following formulas:

$$\frac{dRx}{dx11} = drp11 \tag{59}$$

$$\frac{dRy}{dy11} = drp11 \tag{60}$$

$$\frac{dRz}{dz11} = drp11 \tag{61}$$

$$\frac{dRx}{dx12} = drp12 \tag{62}$$

$$\frac{dRy}{dy12} = drp12 \tag{63}$$

$$\frac{dRz}{dz12} = drp12 \tag{64}$$

$$\frac{dRx}{dx21} = drp21 \tag{65}$$

$$\frac{dRy}{dy21} = drp21 \tag{66}$$

$$\frac{dRz}{dz21} = drp21 \tag{67}$$

$$\frac{dRx}{dx22} = drp22 \tag{68}$$

$$\frac{dRy}{dy22} = drp22 \tag{69}$$

$$\frac{dRz}{dz22} = drp22 \tag{70}$$

may be obtained from formula (42) and, thereby, formula (42) may be substituted in formula (47) to obtain by arranging the relation of the following formula:

$$\frac{dF}{dx11} = \sum_{i=1}^{m} \{drp00 \cdot P00x + drp10 \cdot P10x + drp20 \cdot P20x + \tag{71}$$
$$drp30 \cdot P30x + drp01 \cdot P01x + drp11 \cdot x11 +$$
$$drp21 \cdot x21 + drp31 \cdot P31x + drp02 \cdot P02x +$$
$$drp12 \cdot x12 + drp22 \cdot x22 + drp32 \cdot P32x +$$
$$drp03 \cdot P03x + drp13 \cdot P13x + drp23 \cdot P23x +$$
$$drp33 \cdot P33x - Six) \cdot drp11\}$$

In a similar manner, formula (48) through formula (58) may be transformed to be represented in the form of matrices by each of the x, y, z components to obtain the relation of the following formulas:

$$\begin{bmatrix} \Sigma(drp11 \cdot drp11) & \Sigma(drp21 \cdot drp11) & \Sigma(drp12 \cdot drp11) & \Sigma(drp22 \cdot drp11) \\ \Sigma(drp11 \cdot drp21) & \Sigma(drp21 \cdot drp21) & \Sigma(drp12 \cdot drp21) & \Sigma(drp22 \cdot drp21) \\ \Sigma(drp11 \cdot drp12) & \Sigma(drp21 \cdot drp12) & \Sigma(drp12 \cdot drp12) & \Sigma(drp22 \cdot drp12) \\ \Sigma(drp11 \cdot drp22) & \Sigma(drp21 \cdot drp22) & \Sigma(drp12 \cdot drp22) & \Sigma(drp22 \cdot drp22) \end{bmatrix} \begin{bmatrix} x11 \\ x21 \\ x12 \\ x22 \end{bmatrix} = \begin{bmatrix} -\Sigma DPx \cdot drp11 \\ -\Sigma DPx \cdot drp21 \\ -\Sigma DPx \cdot drp12 \\ -\Sigma DPx \cdot drp22 \end{bmatrix} \tag{72}$$

$$\begin{bmatrix} \Sigma(drp11 \cdot drp11) & \Sigma(drp21 \cdot drp11) & \Sigma(drp12 \cdot drp11) & \Sigma(drp22 \cdot drp11) \\ \Sigma(drp11 \cdot drp21) & \Sigma(drp21 \cdot drp21) & \Sigma(drp12 \cdot drp21) & \Sigma(drp22 \cdot drp21) \\ \Sigma(drp11 \cdot drp12) & \Sigma(drp21 \cdot drp12) & \Sigma(drp12 \cdot drp12) & \Sigma(drp22 \cdot drp12) \\ \Sigma(drp11 \cdot drp22) & \Sigma(drp21 \cdot drp22) & \Sigma(drp12 \cdot drp22) & \Sigma(drp22 \cdot drp22) \end{bmatrix} \begin{bmatrix} x11 \\ x21 \\ x12 \\ x22 \end{bmatrix} = \begin{bmatrix} -\Sigma DPy \cdot drp11 \\ -\Sigma DPy \cdot drp21 \\ -\Sigma DPy \cdot drp12 \\ -\Sigma DPy \cdot drp22 \end{bmatrix} \tag{73}$$

$$\begin{bmatrix} \Sigma(drp11 \cdot drp11) & \Sigma(drp21 \cdot drp11) & \Sigma(drp12 \cdot drp11) & \Sigma(drp22 \cdot drp11) \\ \Sigma(drp11 \cdot drp21) & \Sigma(drp21 \cdot drp21) & \Sigma(drp12 \cdot drp21) & \Sigma(drp22 \cdot drp21) \\ \Sigma(drp11 \cdot drp12) & \Sigma(drp21 \cdot drp12) & \Sigma(drp12 \cdot drp12) & \Sigma(drp22 \cdot drp12) \\ \Sigma(drp11 \cdot drp22) & \Sigma(drp21 \cdot drp22) & \Sigma(drp12 \cdot drp22) & \Sigma(drp22 \cdot drp22) \end{bmatrix} \begin{bmatrix} x11 \\ x21 \\ x12 \\ x22 \end{bmatrix} = \begin{bmatrix} -\Sigma DPz \cdot drp11 \\ -\Sigma DPz \cdot drp21 \\ -\Sigma DPz \cdot drp12 \\ -\Sigma DPz \cdot drp22 \end{bmatrix} \tag{74}$$

Provided that DPx, DPy, DPz are retained in the relation of the following formulas:

$$\begin{aligned} DPx = \ & drp00 \cdot P00x + drp10 \cdot P10x + drp20 \cdot P20x + \\ & drp30 \cdot P30x + drp01 \cdot P01x + drp11 \cdot x11 + \\ & drp21 \cdot x21 + drp31 \cdot P31x + drp02 \cdot P02x + \\ & drp12 \cdot x12 + drp22 \cdot x22 + drp32 \cdot P32x + \\ & drp03 \cdot P03x + drp13 \cdot P13x + drp23 \cdot P32x + \\ & drp33 \cdot P33x - Six \end{aligned} \tag{75}$$

$$\begin{aligned} DPy = \ & drp00 \cdot P00y + drp10 \cdot P10y + drp20 \cdot P20y + \\ & drp30 \cdot P30y + drp01 \cdot P01y + drp11 \cdot y11 + \\ & drp21 \cdot y21 + drp31 \cdot P31y + drp02 \cdot P02y + \\ & drp12 \cdot y12 + drp22 \cdot y22 + drp32 \cdot P32y + \\ & drp03 \cdot P03y + drp13 \cdot P13y + drp23 \cdot P32y + \\ & drp33 \cdot P33y - Siy \end{aligned} \tag{76}$$

$$\begin{aligned} DPz = \ & drp00 \cdot P00z + drp10 \cdot P10z + drp20 \cdot P20z + \\ & drp30 \cdot P30z + drp01 \cdot P01z + drp11 \cdot z11 + \\ & drp21 \cdot z21 + drp31 \cdot P31z + drp02 \cdot P02z + \\ & drp12 \cdot z12 + drp22 \cdot z22 + drp32 \cdot P32z + \\ & drp03 \cdot P03z + drp13 \cdot P13z + drp23 \cdot P32z + \\ & drp33 \cdot P33z - Siz \end{aligned} \tag{77}$$

and thereby it is seen that the x, y, z coordinate values of the internal control points, vector P11 to vector P22, may be set by solving for the four-way linear equations of formulas (75) through (77).

Thus, at the free-form surface forming unit 12, the calculation processing of formulas (75) through (75) is executed on the basis of the found result of the sum of squares of the shortest distances D1 to D81 to find the coordinate values of the internal control points, vector P11 to vector P22.

Further, the patch vector PTB is regenerated by the found coordinate value and a series of points, vector R1 to vector R81, are set again to obtain the sum of squares of the shortest distances. Thereby, the calculation processing of formulas (44) through (47) is repeated.

At this time, at the free-form surface forming unit 12, the change in the coordinate values of the internal control points, vector P11 to vector P22, is detected every time when the calculation processing is repeated. When the change has become less than a predetermined value, the patch vector PTB is generated over again by the coordinate values of the internal control points, vector P11 to vector P22, and, then, the execution proceeds to step SP30 where the processing procedure is completed.

In this manner, it is judged whether projection is possible by rotating the patch vector S(u,v) and, on the basis of the judged result, a free-form curve is projected. Thereby, a framing space may readily be formed on the patch vector S(u,v). Accordingly, the framing space is used to generate a patch having the surface geometry of the patch vector S(u,v) and a desired size.

Thus, the present invention may be used in such as when a design is verified or when parts are investigated from a finished product to readily obtain the result of investigations. Accordingly, the operability of the free-form surface forming unit 12 may be improved.

In an actual example, as shown in FIG. 16, according to the experiment where boundary curves were inputted in desired shapes onto the bottom surface of a hemisphere and the boundary curves were then projected on the spherical surface, a patch having the original spherical geometry was readily generated within a short time period.

With the construction of FIG. 11, a framing space may readily be formed on a patch vector S(u,v) by judging whether projection is possible by rotating the patch vector S(u,v) and by projecting a free-form curve on the basis of the result of judgment. Accordingly, the framing space may be used o generate a patch having the surface geometry of the patch vector S(u,v) and a desired size, whereby it is possible to improve the operability of the free-form surface forming unit.

Conversion of Patch

Figure 18:
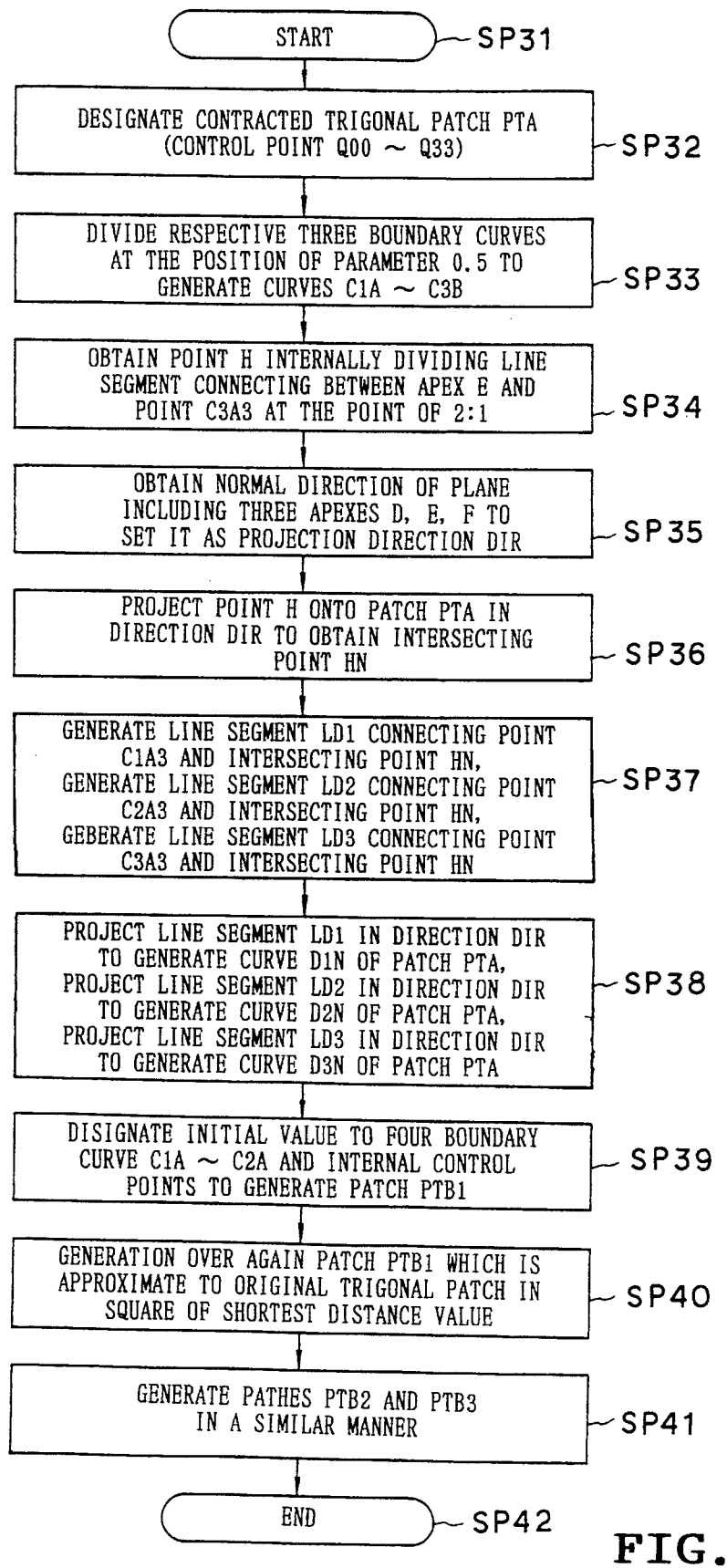
FIG. 18 is a flowchart showing the processing procedure of the conversion of a patch.

The free-form surface forming unit 12 executes the processing procedure shown in FIG. 18 by applying the technique of free-form curve projection as described to convert a contracted trigonal patch into quadrilateral patches.

Figure 19:
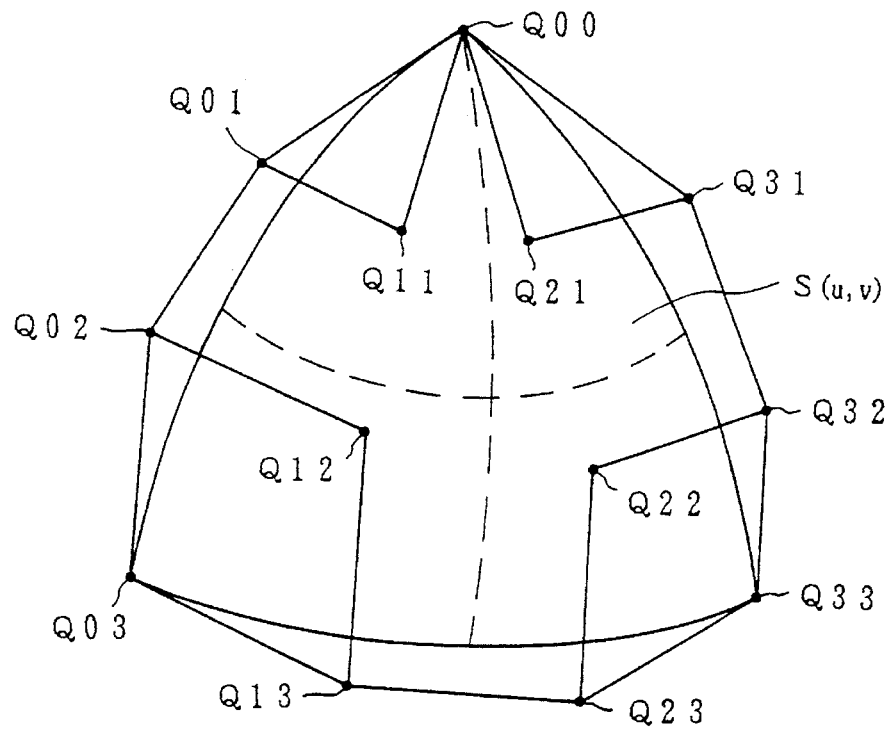
FIG. 19 is a schematic diagram showing a contracted trigonal patch.

Here, a contracted trigonal patch refers to a patch of which, as shown in FIG. 19, the length of one of the boundary curves forming a quadrilateral patch becomes zero, and it may be represented by a vector function vector S(u,v) as indicated by the following formula:

$$
\begin{aligned}
S(u,v) = \ & (1-u)^3(1-v)^3 Q00 + (1-u)^3 3(1-v)^2 v Q00 + \\
& (1-u)^3 3(1-v)v^2 Q00 + (1-u)^3 v^3 Q00 + \\
& 3(1-u)^2 u(1-v)^3 Q01 + 3(1-u)^2 u3(1-v)^2 v Q11 + \\
& 3(1-u)^2 u3(1-v)v^2 Q21 + 3(1-u)^2 uv^3 Q31 + \\
& 3(1-u)u^2(1-v)^3 Q02 + 3(1-u)u^23(1-v)^2 v Q12 + \\
& 3(1-u)u^23(1-v)v^2 Q22 + 3(1-u)u^2 v^3 Q32 + \\
& u^3(1-v)^3 Q03 + u^33(1-v)^2 v Q13 + \\
& u^33(1-v)v^2 Q23 + u^3 v^3 Q33
\end{aligned}
\tag{78}
$$

Such contracted trigonal patch vector S(u,v) is formed at the position of an apex for example when a fret surface is formed on each side of a cube. Since it must be processed using the coordinate data of a control point vector P00 which is common for four terms, there is a problem that its calculation processing is complicated comparing to the surrounding quadrilateral patches.

For this reason, the execution of the free-form surface forming unit 12 proceeds from step SP31 to step SP32 where it takes in the coordinate data of control points, vector Q00 to vector Q33, with respect to a trigonal patch vector PTA (vector S(u,v)) designated by the operator, and, then, it proceeds to step SP33.

Figure 20:
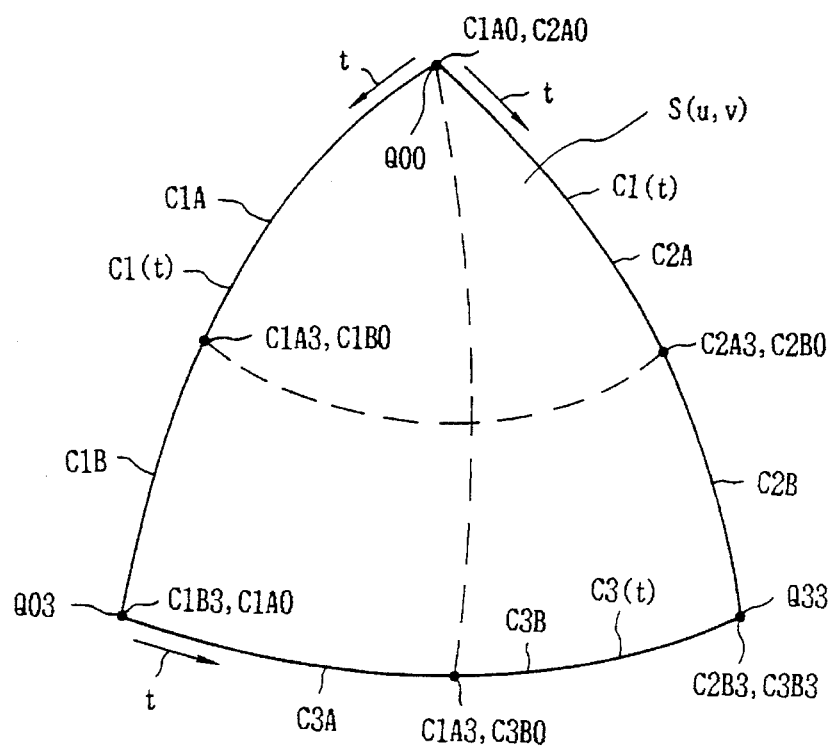
FIG. 20 is a schematic diagram for the explanation of partition of boundary curves.

Here, as shown in FIG. 20, the free-form surface forming unit 12 sets over again control points with respect to the boundary curves, vector C1(t) and vector C2(t), on the both sides of the control point vector P00 to divide the boundary curves, vector C1(t), vector C2(t) and vector C3(t), at the position of parameter 0.5.

That is, the boundary curves, vector C1(t), vector C2(t) and vector C3(t), may be represented respectively by the following formulas:

$$C1(t)=(1-t)^3 Q00+3(1-t)^2 tQ01+3(1-t)t^2 Q02+t^3 Q03 \tag{79}$$

$$C2(t)=(1-t)^3 Q00+3(1-t)^2 tQ31+3(1-t)t^2 Q32+t^3 Q33 \tag{80}$$

$$C3(t)=(1-t)^3 Q03+3(1-t)^2 tQ13+3(1-t)t^2 Q23+t^3 Q33 \tag{81}$$

and, correspondingly, curves, vector C1A(t), vector C1B(t), vector C2A(t), vector C3A(t) and vector C3B(t), may be represented by the following formulas:

$$C1A(t)=(1-t)^3 C1A0+3(1-t)^2 tC1A1+3(1-t)t^2 C1A2+t^3 C1A3 \tag{82}$$

$$C1B(t)=(1-t)^3 C1B0+3(1-t)^2 tC1B1+3(1-t)t^2 C1B2+t^3 C1B3 \tag{83}$$

$$C2A(t)=(1-t)^3 C2A0+3(1-t)^2 tC2A1+3(1-t)t^2 C2A2+t^3 C2A3 \tag{84}$$

$$C2B(t)=(1-t)^3 C2B0+3(1-t)^2 tC2B1+3(1-t)t^2 C2B2+t^3 C2B3 \tag{85}$$

$$C3A(t)=(1-t)^3 C3A0+3(1-t)^2 tC3A1+3(1-t)t^2 C3A2+t^3 C3A3 \tag{86}$$

$$C3B(t)=(1-t)^3 C3B0+3(1-t)^2 tC3B1+3(1-t)t^2 C3B2+t^3 C3B3 \tag{87}$$

Here, point vector C1A0 to point vector C3B3, represent control points of the curves, vector C1A(t) to vector C3B(t), respectively.

Figure 21:
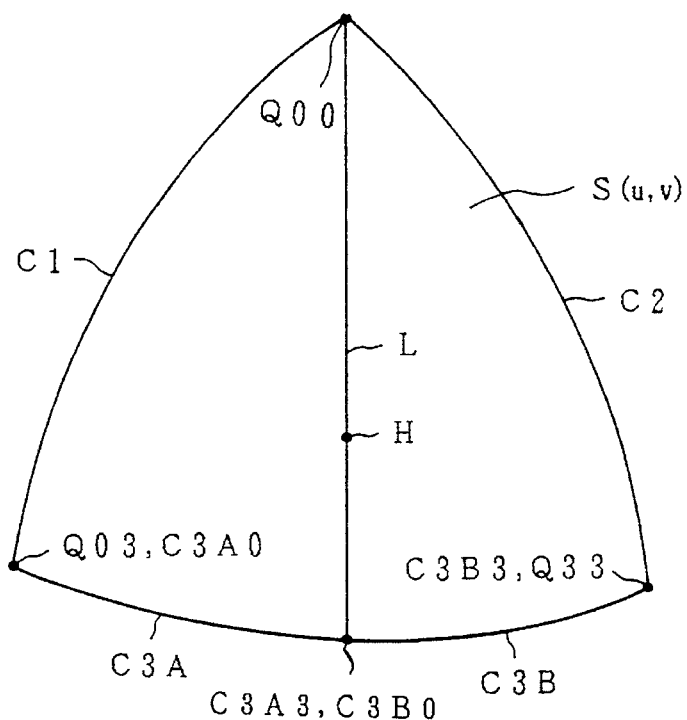
FIG. 21 is a schematic diagram for the explanation of setting of partition point.

Subsequently, the free-form surface forming unit 12 proceeds to step SP34 where, as shown in FIG. 21, it generates a straight line vector L connecting the apex vector Q00 and the middle point of the boundary curve vector C3 opposing the apex vector Q00 (i.e., coinciding with the control point vector C3A3 and C3B0 of vector C3A(t) and vector C3B(t)). A partition point vector H is set, which internally divides the straight line vector L at the point of 2:1 from the apex.

Thereby, at the free-form surface forming unit 12, the trigonal patch PTA is converted into a quadrilateral patch on the basis of the partition point vector H.

Specifically, the free-form surface forming unit 22 proceeds to step SP35 where it generates a plane passing through the three apexes, vector Q00, vector Q03 and vector Q33, of the trigonal patch PTA and finds the direction of normal lines of the plane.

Further, the free-form surface forming unit 12 sets the direction of the normal line as the projecting direction DIR (dx, dy, dz) and then proceeds to step SP36.

Figure 22:
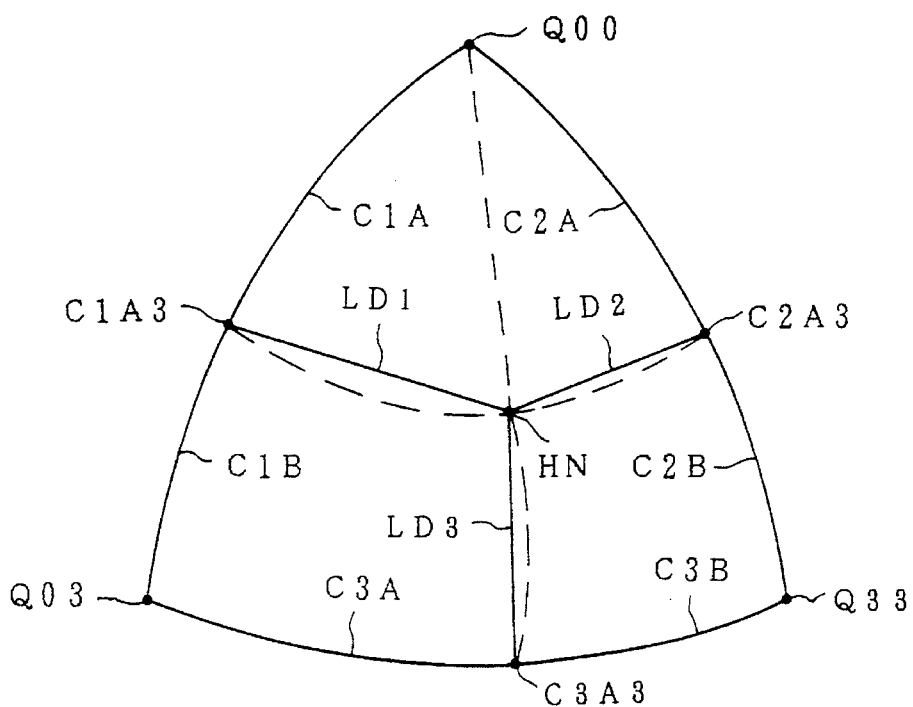
FIG. 22 is a schematic diagram for the explanation of partition of a patch.

Here, as shown in FIG. 22, the free-form surface forming unit 12 extends a straight line from the partition point vector H in the projecting direction DIR and finds the intersecting point vector HN of the trigonal patch vector PTA and the straight line.

Subsequently, the free-form surface forming unit 12 proceeds to step SP37 where it sets a line segment vector LD1 connecting the control point vector C1A3 and the intersecting point vector HN and then sets a line segment LD2 connecting the control point vector C2A3 and the intersecting point HN, and a line segment a vector LD3 connecting the control point vector C3A3 and the intersecting point HN.

That is, for the line segment LD1, the control point vector C1A3 and the intersecting point vector HN are assumed as control points, vector PD0 and vector PD3, respectively, and the internal control points, vector PD1 and vector PD2 are set whereby it may be represented by the following formula:

$$L1(t)=(1-t)^3 PD0+3(1-t)^2 tPD1+3(1-t)t^2 PD2+t^3 PD3 \tag{88}$$

When the line segments vector LD1 to LD3 have been set in this manner, the free-form surface forming unit 12 proceeds to step SP38 where it executes the processing procedure described above with reference to FIG. 4 to project the line segments, vector LD1 to vector LD3, onto the trigonal patch vector PTA and thereby generates, as shown in FIG. 3, Bezier curves, vector LD1N, vector LD2N and vector LD3N.

That is, at the free-form surface forming unit 12, a normal of the patch vector PTA is formed at the control points, vector PD0 to PD3, at the both ends of the line segments vector LD1 to LD3 and a plane is formed vertically to the normal.

Further, at the free-form surface forming unit 12, the remaining control point vectors PD1 to PD2 of the line segment vectors LD1 to LD3 are projected onto the plane, and thereby the direction of the control side vector is obtained from the control point vectors PD0 to PD3 of the both end points.

Subsequently, the free-form surface forming unit 12 divides parameter t in equal parts and successively changes the value thereof with respect to Bezier expressions representing the line segment vectors LD1 to LD3 to form series of points, vector L(0) to vector L(1.0), for projection on the respective line segment vectors LD1 to LD3. Then, it projects the series of points, vector L(0) to vector L(1.0), onto the patch vector PTA.

Thereby, the free-form surface forming unit 12 forms a series of point vectors LA10 to LA110 corresponding to the respective line segment vectors LD1 to LD3 on the patch vector PTA and then executes the calculation processing of formula (20) to temporarily set the internal control points.

Figure 23:
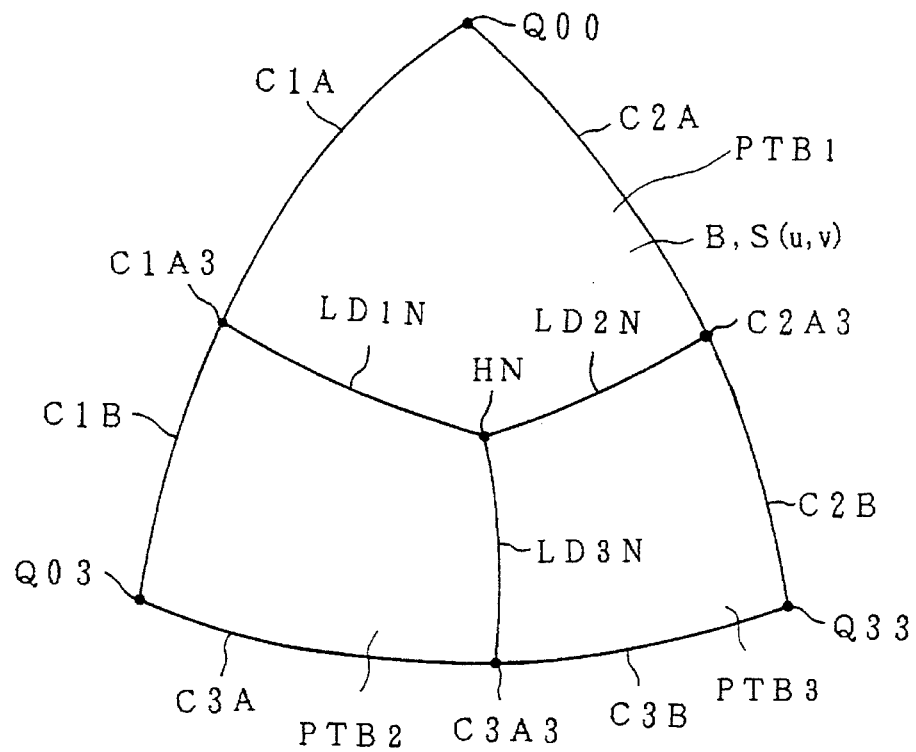
FIG. 23 is a schematic diagram for the explanation of temporary setting of a patch.
Figure 1:
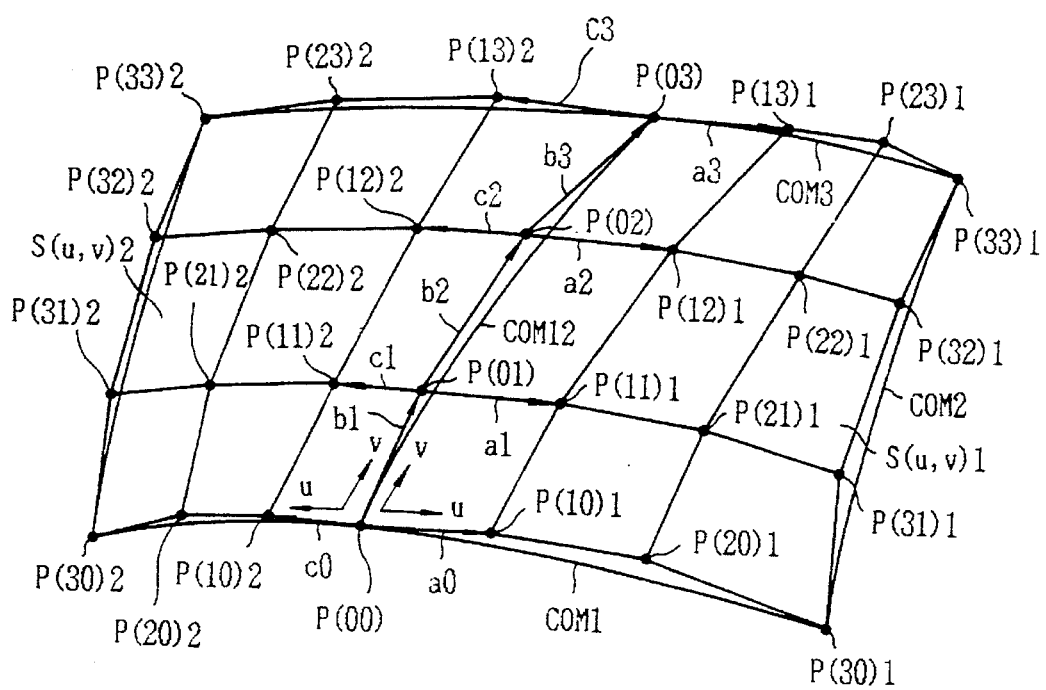
FIG. 1 is a schematic diagram for the explanation of a free-form curve surface.

Further, the temporarily set internal control points are used to execute the calculation processing of formulas (21) to (26), and thereby, as shown in FIG. 23, Bezier curve vectors LD1N to LD3N are generated, which are obtained by projecting the line segment vectors LD1 to LD3 onto the patch vector PTA.

When, in this manner, Bezier curve vectors LD1N to LD3N are generated on the patch vector PTA, the free-form surface forming unit 12 proceeds to step SP39 where it divides the patch vector PTA.

Here, the free-form surface forming unit 12 forms the boundary curves by: curve vector C1A(t) and curve vector C2A(t) which are interposed by the apex vector Q00 of the trigonal patch vector PTA; and the Bezier curves, vector LD1N and vector LD2N, which oppose the curve vector C1A(t) and the curve vector C2A(t). Thus, a first framing space is formed by these boundary curves.

In a similar manner: boundary curves are formed by curve vector C1B(t) and curve vector C3A(t) which are interposed by the apex vector Q03 and by the Bezier curves, vector LD1N and vector LD3N, which oppose the curve vector C1B(t) and the curve vector C3A(t) to form a second framing space by the boundary curves; and boundary curves are formed by curve vector C2B(t) and curve vector C3B(t) which are interposed by the apex vector Q33 and by the Bezier curves, vector LD3N and vector LD2N, which oppose the curve vector C2B(t) and the curve vector C3B(t) to form a third framing space by the boundary curves.

Subsequently, by performing the calculation processing of formulas (27) through (77), the free-form surface forming unit 12 executes the processing procedure described above with reference to FIG. 12 to generate a patch vector PTB1 on the first framing space.

Subsequently, the free-form surface forming unit 12 proceeds to step SP40 where the surface geometry of the patch vector PTB1 is transformed to the surface geometry of the original patch vector PTA and then it proceeds to step SP41.

Here, in a similar manner, the free-form surface forming unit 12 generates the patches, vector PTB2 and vector PTB3, in the second and third framing spaces and then transform them into the surface geometry of the original patch vector PTA. Then it proceeds to step SP42 where the processing procedure is terminated.

Thus, the free-form surface forming unit 12 represents the original trigonal patch vector PTA by three quadrilateral patches, vector PTB1 to vector PTB3, and thereby it is capable of performing calculation processing readily and with high accuracy such as in the calculation processing of transformation of a curved surface.

Further, in this manner, a total geometry may be readily represented only by quadrilateral patches. Accordingly, the entire portions are connected by the condition of continuity of tangential planes to design a surface geometry which is smooth as a whole.

According to the construction of FIG. 18: on the basis of the plane including through the apexes of a trigonal patch, line segments generated based on the apexes of the trigonal patch and the surfaces opposing thereto is projected in the direction of the normal of the plane to form Bezier curves on the trigonal patch; and, after forming framing spaces by the Bezier curves, patches having the original surface geometry are generated. The original trigonal patch may be converted readily and with high accuracy into quadrilateral patches.

Other Embodiments

It should be noted that, while in the above described embodiments a case has been described where free-form curves, boundary curves are projected onto a plurality of quadrilateral patches, the present invention is not limited to this and it may be widely applied to such cases as where projection is made on a single quadrilateral patch or where projection is made on a trigonal patch.

Further, while in the above described embodiments a description has been given with respect to a case where free-form curves, boundary curves that are formed of curves are projected, the present invention is not limited to this and a straight line may be represented by a Bezier curve to be projected.

Furthermore, while in the above described embodiments a description has been given with respect to a case where patches are cut out by projecting boundary lines within a patch, the present invention is not limited to this and one may be cut out from a plurality of patches.

As has been described, according to the present invention: it is judged whether projection is possible by rotating a patch; on the basis of the result of judgment, nodal points of the object to be projected and a series of points set on the object to be projected are projected on the patch; and, on the basis of the result of projection, a free form curve is generated on the patch. Thereby, it is possible to obtain a free-form curve forming method capable of generating readily and with high accuracy a free-form curve having the geometry obtained by projecting a free-form curve.

At this time, if the original patch is consisting of a plurality of patches, by judging whether projection is possible by rotating by each patch, it is possible to obtain a free-form curve forming method capable of generating readily and with high accuracy a free-form curve having the geometry obtained by projecting a free-form curve on the plurality of patches.

Further, by projecting boundary curves, it is possible to obtain a free-form curve forming method capable of generating a framing space having the geometry obtained by projecting the boundary curves on the patch which is the subject of projection.

Furthermore, a patch is generated on the framing space formed in this manner and it may be transformed into the surface geometry of the original patch to obtain a free-form curve forming method capable of readily generating a patch having the original surface geometry and a desired size.

Moreover, with respect to a contracted trigonal patch: line segments are projected to generate boundary curves so that quadrilateral patches may be formed; framing process is performed by using the boundary curves and patches are generated and transformed. Thereby, a trigonal patch may be transformed readily and with high accuracy into a plurality of quadrilateral patches and it is possible to obtain a free-form surface forming method capable of improving the efficiency of operation.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A method of forming an object on the basis of data representing a free-form curve projected onto a patch, the method comprising the steps of:

generating control points between two nodal points on a three-dimensional space;

generating said free-form curve which is represented by a vector function, said vector function being capable of representing said free-form curve by designating said nodal points and said control points;

rotating said patch about a nodal point vector to make its projecting direction coincide with a preselected projecting direction, said patch being represented by a predetermined vector function formed on a framing space, and thereafter determining the maximum value and minimum value of y and z coordinate values, x and z coordinate values, or x and y coordinate values with respect to control points of the rotated patch;

judging whether said nodal points are within said patch with respect to said free-form curve by determining whether the coordinate values of said nodal points fall between said determined maximum and minimum values, wherein said nodal points are projected onto said patch when said coordinate values of said nodal points fall between said determined maximum and minimum values;

generating, on the basis of judging whether said nodal points are within said patch, projection nodal points formed by projecting said nodal points from said projecting direction onto said patch with respect to said free-form curve to be projected;

generating a series of points on said free-form curve to be projected;

judging whether each point of said series of points is within said patch from the projecting direction by determining whether said series of points falls between said determined maximum and minimum values wherein said series of points is projected onto said patch when said series of points falls between said determined maximum and minimum values;

forming, on the basis of judging whether each point of said series of points is within said patch, a projection series of points formed by projecting each point of said series of points from said projecting direction onto said patch;

projecting said free-form curve from said projecting direction onto said patch, wherein said projected free-form curve is a function of said projection nodal points and said projection series of points;

transmitting data representing said projected free-form curve to a tool path forming unit;

generating at said tool path forming unit processing data on the basis of said data representing said projected free-form curve; and using said processing data to mold an object, said object being a physical embodiment of said projected free-form curve, wherein a plurality of free-form curves to be projected comprises boundary curves forming a predetermined framing space; and said free-form curves being projected from said projecting direction onto said patch are formed on said patch to generate a framing space having said free-form curves as its boundary curves.

2. A method of forming an object on the basis of data representing a free-form curve projected onto a region comprising a plurality of patches, the method comprising the steps of:

generating control points between two nodal points on a three-dimensional space;

generating said free-form curve which is represented by a vector function, said vector function being capable of representing said free-form curve by designating said nodal points and said control points;

rotating said respective patches about respective nodal point vectors to make their projecting directions coincide with respective preselected projecting directions, and thereafter determining the maximum value and minimum value of y and z coordinate values, x and z coordinate values, or x and y coordinate values with respect to control points of the rotated patches;

judging whether said nodal points are within said respective patches with respect to said free-form curve to be projected by determining whether the coordinate values of said nodal points fall between said determined maximum and minimum values, wherein said nodal points are projected onto said respective patches when said coordinate values of said nodal points fall between said determined maximum and minimum values;

generating, on the basis of judging whether said nodal points are within said respective patches, projection nodal points formed by projecting said nodal points from said respective projecting directions onto said patches with respect to said free-form curve to be projected;

judging whether each point of said series of points is within a respective patch from the projecting direction by determining whether said series of points falls between said determined maximum and minimum values, wherein said series of points is projected onto said respective patches when said series of points falls between said determined maximum and minimum values;

forming, on the basis of judging whether each point of said series of points is within a respective patch, a projection series of points formed by projecting each point of said series of points from said projecting directions onto the respective patches;

projecting said free-form curve from said projecting direction onto said original plurality of patches, wherein said projected free-form curve is a function of said projection nodal points and said projection series of points;

transmitting data representing said projected free-form curve to a tool path forming unit;

generating at said tool path forming unit processing data on the basis of said data representing said projected free-form curve; and using said processing data to mold said object, said object being a physical embodiment of said projected free-form curve, wherein; a plurality of free-form curves to be projected comprises boundary curves forming a predetermined framing space; and said free-form curves being projected from said projection onto said patches are formed on said patches to generate a framing space having said free-form curves as its boundary curves.

3. A method of forming an object on the basis of data representing free-form curves projected onto a patch, the method comprising the steps of:

generating free-form curves forming a predetermined framing space from a predetermined direction onto an original patch to generate a framing space having said free-form curves generated on said original patch as its boundary curves;

temporarily generating a patch on said framing space;

generating a patch having the surface geometry of said original patch by transforming the temporarily generated patch, wherein said free-form curves generated on said original patch are formed by the steps of:

rotating said original patch about a nodal point vector so as to make said projecting direction coincide with a preselected projecting direction with respect to said original patch, and thereafter, finding the maximum value and minimum value of y and z coordinate values, x and z coordinate values or x and y coordinate values with respect to control points of the rotated patch;

judging whether said nodal points are within the original patch with respect to free-form curves to be projected by determining whether the coordinate values of said nodal points fall between said determined maximum and minimum values, wherein said nodal points are projected onto the original patch when said coordinate values of said nodal points fall between said determined maximum and minimum values;

generating, on the basis of judging whether said nodal points are within the original patch, projection nodal points formed by projecting said nodal points from said projecting direction onto said original patch with respect to said free-form curves to be projected;

generating a series of points on said free-form curves to be projected;

judging whether each point of said series of points is within the original patch by determining whether said series of points falls between said determined maximum and minimum values, wherein said series of points is projected onto the original patch when said series of points falls between said determined maximum and minimum values;

forming, on the basis of judging whether each point of said series of points is within the original patch, a projection series of points formed by projecting each point of said series of points from said projection direction onto the original patch; and forming free-form curves to be projected from said projecting direction onto said original patch, wherein said projected free-form curves are a function of said projection nodal points and said projection series of points;

and forming said object by the steps of:

transmitting data representing said projected free-form curves to a tool path forming unit;

generating at said tool path forming unit processing data on the basis of said data representing said projected free-form curves; and using said processing data to mold an object, said object being a physical embodiment of said projected free-form curves.

4. A method of forming an object on the basis of data representing a free-form surface, the method comprising the steps of:

forming a line segment connecting an apex of a trigonal patch and a middle point of a boundary curve opposing said apex;

thereafter, setting a partition point on said trigonal patch;

forming line segments connecting said partition point and the respective boundary curves of said trigonal patch and generating Bezier curves on said trigonal patch by projecting the line segments onto said trigonal patch;

forming a framing space by said Bezier curves and said boundary curves partitioned by said Bezier curves;

arranging said boundary curves partitioned by said Bezier curves to form quadrilateral patches by setting internal control points on said framing space;

converting said trigonal patch into a plurality of said quadrilateral patches by transforming the surface geometry of said quadrilateral patches into the surface geometry of said trigonal patch;

using said quadrilateral patches to form geometric data of an object having a free-form surface;

generating, on the basis of said geometric data, processing data; and using said processing data for molding an object, said object being a physical embodiment of said free-form surface.

5. An apparatus for forming an object on the basis of data representing a free-form curve projected onto a patch, said apparatus comprising:

means for generating control points between two nodal points on a three-dimensional space;

means for generating said free-form curve which is represented by a vector function, said vector function being capable of representing said free-form curve by designating said nodal points and said control points;

means for rotating said patch about a nodal point vector to make its projecting direction coincide with a preselected projecting direction, said patch being represented by a predetermined vector function formed on a framing space, and thereafter determining the maximum value and minimum value of y and z coordinate values, x and z coordinate values, or x and y coordinate values with respect to control points of the rotated patch;

first means for judging whether said nodal points are within said patch with respect to said free-form curve by determining whether the coordinate values of said nodal points fall between said determined maximum and minimum values, wherein said nodal points are projected onto said patch when said coordinate values of said nodal points fall between said determined maximum and minimum values;

means responsive to said first judging means for generating projection nodal points formed by projecting said nodal points from said projecting direction onto said patch with respect to said free-form curve to be projected;

means for generating a series of points on said free-form curve to be projected;

second means for judging whether each point of said series of points is within said patch from the projecting direction by determining whether said series of points falls between said determined maximum and minimum values, wherein said series of points is projected onto said patch when said series of points falls between said determined maximum and minimum values;

means responsive to said second judging means for forming a projection series of points formed by projecting each point of said series of points from said projecting direction onto said patch;

means for projecting said free-form curve from said projecting direction onto said patch, wherein said projected free-form curve is a function of said projection nodal points and said projection series of points;

means for transmitting data representing said projected free-form curve to a tool path forming unit;

means for generating at said tool path forming unit processing data on the basis of said data representing said projected free-form curve; and means for using said processing data to mold an object, said object being a physical embodiment of said projected free-form curve, wherein; a plurality of free-form curves to be projected comprises boundary curves forming a predetermined framing space; and said free-form curves being projected from said projection onto said patch are formed on said patch to generate a framing space having said free-form curves as its boundary curves.

\* \* \* \* \*